US012455572B2

(12) United States Patent
Suzuki et al.

(10) Patent No.: US 12,455,572 B2
(45) Date of Patent: Oct. 28, 2025

(54) INFORMATION PROCESSING APPARATUS, INFORMATION PROCESSING METHOD, AND INFORMATION PROCESSING PROGRAM

(71) Applicant: SONY GROUP CORPORATION, Tokyo (JP)

(72) Inventors: Kento Suzuki, Kanagawa (JP); Norifumi Kikkawa, Tokyo (JP); Atsushi Okamori, Tokyo (JP); Daisuke Fukunaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 240 days.

(21) Appl. No.: 17/925,722

(22) PCT Filed: Jun. 8, 2021

(86) PCT No.: PCT/JP2021/021658
§ 371 (c)(1),
(2) Date: Nov. 16, 2022

(87) PCT Pub. No.: WO2021/256322
PCT Pub. Date: Dec. 23, 2021

(65) Prior Publication Data
US 2023/0350422 A1    Nov. 2, 2023

(30) Foreign Application Priority Data

Jun. 16, 2020  (JP) .................... 2020-104012

(51) Int. Cl.
*G05D 1/00*    (2006.01)

(52) U.S. Cl.
CPC .................. *G05D 1/0274* (2013.01)

(58) Field of Classification Search
CPC ..... G05D 1/0274; G05D 1/024; G05D 1/0272
USPC ............................................. 701/447
See application file for complete search history.

(56) References Cited

U.S. PATENT DOCUMENTS

2018/0079085 A1* 3/2018 Nakata .................. G05D 1/024
2021/0271257 A1* 9/2021 Watanabe ............... G06F 18/24

FOREIGN PATENT DOCUMENTS

| JP | 2017-045447 A | | 3/2017 |
| JP | 2019-525342 A | | 9/2019 |
| WO | WO 2019/054209 A1 | | 3/2019 |
| WO | WO-2020-008754 | * | 1/2020 |
| WO | WO 2020/008754 A1 | | 1/2020 |

* cited by examiner

*Primary Examiner* — Muhammad Shafi
(74) *Attorney, Agent, or Firm* — Paratus Law Group, PLLC

(57) ABSTRACT

An information processing apparatus (100) includes a self-position estimation unit (13) that estimates a self-position of a mobile body based on information concerning a position of a moving object at a predetermined time retained by the mobile body and information concerning a position of the moving object at the predetermined time retained by another mobile body.

12 Claims, 24 Drawing Sheets

FIG.13

| LiDAR DATA |
|---|
| TIME |
| FREQUENCY |
| POINT CLOUD |

FIG.14

| depth CAMERA DATA |
|---|
| TIME |
| FREQUENCY |
| IMAGE |
| DEPTH INFORMATION |

FIG.15

| IMU DATA |
|---|
| TIME |
| FREQUENCY |
| ORIENTATION |
| ANGULAR VELOCITY |
| LINEAR ACCELERATION |

FIG.16

| ODOMETRY DATA |
|---|
| TIME |
| FREQUENCY |
| POSE |
| SPEED |

FIG.17

| GENERATION UNIT INPUT DATA |
|---|
| TIME |
| IMU DATA |
| ODOMETRY DATA |
| LiDAR DATA |
| depth CAMERA DATA |

FIG.18

| GENERATION UNIT OUTPUT DATA |
|---|
| TIME |
| STATIC MAP DATA |
| TRAJECTORY NODE DATA |
| TIME-SERIES DIFFERENTIAL DATA |

FIG.19

| STATIC MAP DATA |
|---|
| CREATION START TIME |
| CREATION COMPLETION TIME |
| submap_id |
| POSTURE |
| GRID RESOLUTION |
| GRID SIZE |
| VALUE LIST OF GRIDS |

FIG.20

| TIME-SERIES DIFFERENTIAL DATA |
|---|
| node_id |
| DIFFERENTIAL SENSOR DATA |

FIG.21

| TRAJECTORY NODE DATA |
|---|
| TIME |
| node_id |
| submap_id |
| POSTURE |
| MATCHING DATA |

FIG.22

| SELF-POSITION DATA IN Local COORDINATE SYSTEM |
|---|
| TIME |
| POSTURE |

FIG.23

| INTER-submap CONSTRAINT CONDITIONS |
|---|
| TIME |
| MATCHING SOURCE submap_id |
| MATCHING DESTINATION submap_id |
| RELATIVE POSTURE |

FIG.24

| TRAJECTORY-submap CONSTRAINT CONDITIONS |
|---|
| TIME |
| MATCHING SOURCE submap_id |
| MATCHING DESTINATION TRAJECTORY node_id |
| RELATIVE POSTURE |

FIG.29

| MATCHING TARGET DATA OF INTER-submap MATCHING |
|---|
| MATCHING SOURCE submap_id |
| MATCHING DESTINATION submap_id |
| INITIAL RELATIVE POSTURE |

FIG.30

| submap RESTORATION TIME DATA |
|---|
| submap_id |
| RESTORATION TIME |
| RESTORATION node_id |

INFORMATION PROCESSING APPARATUS, INFORMATION PROCESSING METHOD, AND INFORMATION PROCESSING PROGRAM

CROSS REFERENCE TO PRIOR APPLICATION

This application is a National Stage Patent Application of PCT International Patent Application No. PCT/JP2021/021658 (filed on Jun. 8, 2021) under 35 U.S.C. § 371, which claims priority to Japanese Patent Application No. 2020-104012 (filed on Jun. 16, 2020), which are all hereby incorporated by reference in their entirety.

FIELD

The present invention relates to an information processing apparatus, an information processing method, and an information processing program.

BACKGROUND

In recent years, autonomous mobile bodies equipped with artificial intelligence, such as robot vacuum cleaners and pet robots in homes and transport robots in factories and distribution warehouses, have been actively developed.

In an autonomous mobile body, it is important to accurately estimate the current position and posture (hereinafter, referred to as self-position) of the autonomous mobile body not only in reliably reaching a destination but also in safely acting according to a surrounding environment.

As a technique for estimating the self-position, for example, SLAM (Simultaneous Localization and Mapping) is present. SLAM is a technique for simultaneously performing estimation of a self-position and creation of an environmental map and estimates the self-position using the created environmental map simultaneously with creating the environmental map using information acquired by various sensors.

In SLAM, the self-position is estimated by collating landmarks on the environmental map and information (hereinafter referred to as sensor data as well) acquired by the various sensors. However, when an environment includes a moving obstacle such as a person (hereinafter referred to as dynamic obstacle as well), matching of the landmarks on the environmental map and the sensor data tends to fail and estimation accuracy of the self-position is deteriorated Therefore, there is known a technique for defining a use region of an autonomous mobile body in advance on a map to prevent the autonomous mobile body from being easily affected even if a surrounding environment including the dynamic obstacle changes.

CITATION LIST

Patent Literature

Patent Literature 1: JP 2019-525342 A

SUMMARY

Technical Problem

However, in the above-described conventional technique, it is not always possible to improve the estimation accuracy of the self-position. For example, in the above-described conventional technique, the use region of the autonomous mobile body is merely defined in advance on the map. The estimation accuracy of the self-position is not always improved.

Therefore, the present disclosure proposes an information processing apparatus, an information processing method, and an information processing program capable of improving the estimation accuracy of the self-position.

To solve the above problem, an information processing apparatus includes a self-position estimation unit that estimates a self-position of a mobile body based on information concerning a position of a moving object at a predetermined time retained by the mobile body and information concerning a position of the moving object at the predetermined time retained by another mobile body.

BRIEF DESCRIPTION OF DRAWINGS

FIG. 13 is a diagram illustrating an example of output data of LiDAR according to the first embodiment of the present disclosure.

FIG. 14 is a diagram illustrating an example of output data of a depth camera according to the embodiment.

FIG. 15 is a diagram illustrating an example of output data of an IMU according to the embodiment.

FIG. 16 is a diagram illustrating an example of output data of odometry according to the embodiment.

FIG. 17 is a diagram illustrating an example of input data of a generation unit 12 according to the embodiment.

FIG. 18 is a diagram illustrating an example of output data of the generation unit 12 according to the embodiment.

FIG. 19 is a diagram illustrating an example of static map data according to the embodiment.

FIG. 20 is a diagram illustrating an example of time-series differential data according to the embodiment.

FIG. 21 is a diagram illustrating an example of trajectory node data according to the embodiment.

FIG. 22 is a diagram illustrating an example of self-position data in a Local coordinate system according to the embodiment.

FIG. 23 is a diagram illustrating an example of constraint conditions between a submap and a submap according to the embodiment.

FIG. 24 is a diagram illustrating an example of constraint conditions between a submap and a trajectory according to the embodiment.

FIG. 29 is a diagram illustrating an example of matching target data of matching between a submap and a submap according to the embodiment.

FIG. 30 is a diagram illustrating an example of submap restoration time data according to the embodiment.

DESCRIPTION OF EMBODIMENTS

Figure 1:
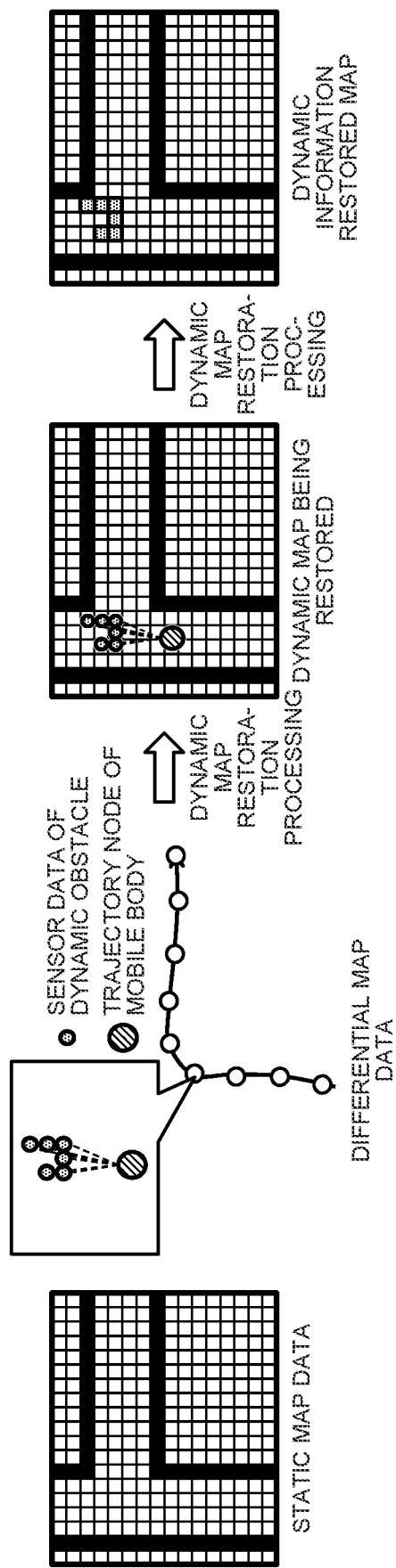
FIG. 1 is a diagram for explaining an overview of submap restoration processing according to a first embodiment of the present disclosure.

Embodiments of the present disclosure are explained in detail below with reference to the drawings. Note that, in the embodiments explained below, redundant explanation is omitted by denoting the same parts with the same reference numerals and signs.

In the present specification and the drawings, a plurality of components having substantially the same functional configuration are sometimes distinguished by adding different hyphenated numbers after the same reference numerals and signs. For example, a plurality of components having substantially the same functional configuration are distinguished as, for example, a mobile body 10-1 and a mobile body 10-2 according to necessary. However, when it is not particularly necessary to distinguish each of a plurality of components having substantially the same functional configuration, only the same reference numeral is added. For example, when it is not necessary to particularly distinguish the mobile body 10-1 and the mobile body 10-2, the mobile body 10-1 and the mobile body 10-2 are simply referred to as mobile body 10.

The present disclosure is explained according to order of items described below.

1. Introduction
2. First Embodiment
2-1. Overview of information processing
2-2. Configuration of an information processing system
2-3. Modification
2-4. Operation example of the information processing system
3. Second Embodiment
4. Summary
5. Hardware configuration 1. Introduction As explained above, in the SLAM, a self-position is estimated by comparing landmarks on an environmental map and sensor data acquired by various sensors. Herein, conventionally, when a dynamic obstacle (hereinafter referred to as moving object as well) is included in an environment, a static obstacle (hereinafter referred to as static object as well) located behind the dynamic obstacle is hindered by the dynamic obstacle and is hard to be observed. Since dynamic obstacles change and are present in the same place, as a result of accumulation of sensor data, a probability of an obstacle being present in the place increases. Therefore, when the density of dynamic obstacles included in the environment increases, the matching between the landmarks on the environmental map and the sensor data acquired by the various sensors tends to fail and an accurate map of static obstacles cannot be made. As a result, there is a problem that estimation accuracy of a self-position in the SLAM is deteriorated.

Therefore, an information processing apparatus according to an embodiment estimates a self-position of a mobile body based on information concerning a position of a moving object at predetermined time retained by the mobile body and information concerning a position of the moving object at the predetermined time retained by another mobile body. In this way, when matching sensor data between a plurality of mobile bodies, the information processing apparatus performs the matching while aligning times of the sensor data. Consequently, even when a dynamic obstacle is included in an environment, the information processing apparatus can utilize the dynamic obstacle as a landmark common to a plurality of mobile bodies. Consequently, the information processing apparatus can generate a more accurate map. Therefore, the information processing apparatus can improve estimation accuracy of a self-position.

For example, when SLAM is performed by a plurality of mobile bodies, a plurality of mobile bodies can exist at the same time in near spaces. However, when an initial position of the matching is known, a more accurate map can be generated by matching sensor data of mobile bodies spatially close to each other (referred to as space constraint as well). Here, the information processing apparatus according to the present embodiment can more robustly perform the matching by matching sensor data temporally close to each other (referred to as time constraint as well) in addition to the space constraint and, therefore, can generate a more accurate map. Therefore, since the information processing apparatus can estimate a self-position based on the more accurate map, estimation accuracy of the self-position can be improved.

2. First Embodiment

Figure 11:
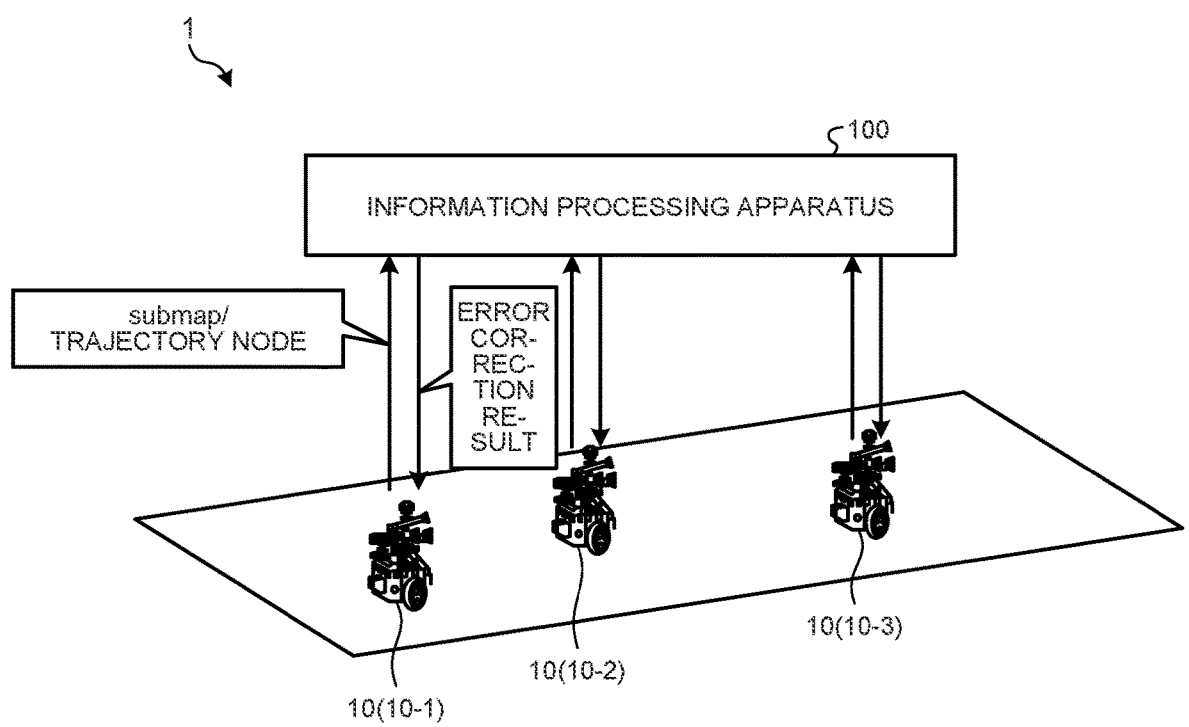
FIG. 11 is a diagram illustrating a schematic configuration example of an information processing system according to the embodiment.

Information processing according to a first embodiment of the present disclosure is realized by an information processing system 1. The information processing system 1 includes an information processing apparatus 100 and a mobile body 10. The information processing apparatus 100 and the mobile body 10 are communicably connected in a wired or wireless manner via a predetermined network. The information processing system 1 may include any number of mobile bodies 10 and any number of information processing apparatuses 100. For example, the information processing system 1 has a server-client configuration as illustrated in FIG. 11 explained below.

The mobile body 10 is a robot that autonomously moves. The mobile body 10 observes sensor data of a static object or a moving object with various sensors mounted on the mobile body 10 while moving in an environment. The mobile body 10 generates map data concerning an environmental map based on the sensor data. The mobile body 10 uploads the generated map data to the information processing apparatus 100. Each of the mobile bodies 10 receives map data error-corrected based on the map data of a plurality of mobile bodies 10 from the information processing apparatus 100 and estimates a self-position based on the received map data.

The information processing apparatus 100 acquires map data concerning an environmental map from each of the plurality of mobile bodies 10. The information processing apparatus 100 performs matching processing for matching the map data acquired from each of the plurality of mobile bodies 10. The information processing apparatus 100 performs error correction processing on the map data based on a result of the matching processing and a relative positional relation between the map data. The information processing apparatus 100 distributes the error-corrected map data to each of the plurality of mobile bodies 10 in downstream.

2-1. Overview of Information Processing

First, an overview of submap restoration processing according to the first embodiment of the present disclosure is explained with reference to FIG. 1. Here, the submap indicates a partial map of SLAM. Specifically, the submap according to the first embodiment is, for example, a grid map, which is two-dimensional matrix data. Note that the submap may be three-dimensional map data. For example, as the three-dimensional map data, a voxel map and a point group map to which height information is added are present. Specifically, in the grid map, an obstacle presence probability is set high for a cell on the grid map corresponding to a position where presence of an obstacle is observed by a sensor or the like mounted on a mobile body and an obstacle presence probability is set low for a cell where it is observed that no obstacle is present. For example, the information processing apparatus 100 sets obstacle presence probabilities for grids included in the submap. For example, the information processing apparatus 100 determines that an obstacle is present in a grid position where an obstacle presence probability exceeds a predetermined threshold. The information processing apparatus 100 determines that no obstacle is present in a grid position where an obstacle presence probability is equal to or smaller than the predetermined threshold. The grid in which the obstacle presence probability is set on the grid map in this way is sometimes called a probability grid.

The information processing apparatus 100 according to the first embodiment makes it possible to restore a submap (hereinafter referred to as map data as well) at any time in order to realize matching using dynamic obstacles. Specifically, the information processing apparatus 100 stores the map data divided into a static map data and differential map data in time series as illustrated on the left of FIG. 1 in order to make it possible to restore the submap at any time with a minimum data amount increase. Here, the static map data indicates data of a submap including only static obstacles. The differential map data in time series (hereinafter referred to time-series differential data as well) is information including a representative point (hereinafter referred to as trajectory node as well) of a moving route of the mobile body 10 while moving in a region included in the static map data and differential sensor data obtained by removing sensor data of a static obstacle from sensor data observed at the position of the trajectory node.

As illustrated in the center of FIG. 1, the information processing apparatus 100 superimposes sensor data of a dynamic obstacle detected in a trajectory node corresponding to predetermined time on the static map data. Subsequently, as illustrated on the right side of FIG. 1, the information processing apparatus 100 restores data of a submap (hereinafter referred to as dynamic map as well) at predetermined time including both the dynamic obstacle and the static obstacle based on the sensor data of the dynamic obstacle superimposed on the static map data.

Figure 2:
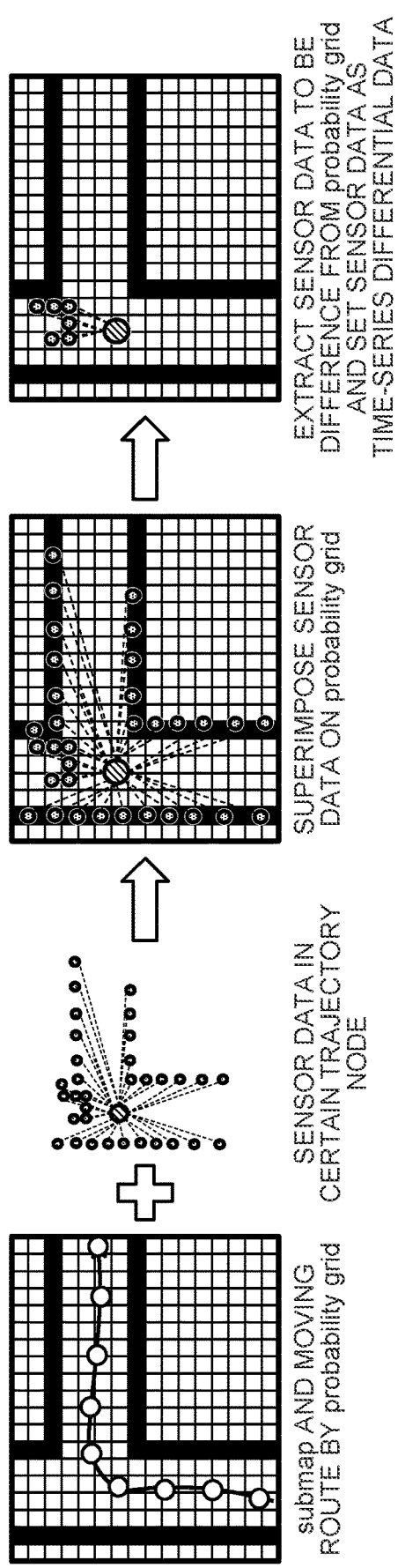
FIG. 2 is a diagram for explaining an overview of time-series differential data extraction processing according to the embodiment.

Subsequently, an overview of extraction processing for the time-series differential data according to the embodiment is explained with reference to FIG. 2. As illustrated from the left to the center of FIG. 2, at timing when the static map data is generated, the mobile body 10 superimposes, on the static map data, sensor data observed in a certain trajectory node on a moving path of the mobile body 10 that has moved in a region included in the static map data. Subsequently, the mobile body 10 removes sensor data superimposed on a grid where a static obstacle is located on the static map data from the sensor data superimposed on the static map data to extract sensor data of a dynamic obstacle. The mobile body 10 sets the extracted sensor data as time-series differential data. Similarly, the mobile body 10 extracts sensor data of dynamic obstacles observed in trajectory nodes included in the static map data. Subsequently, the mobile body 10 stores the extracted sensor data of the dynamic obstacle, time when the sensor data is observed, the trajectory node, and the static map data in association with one another. For example, the mobile body 10 compresses the extracted sensor data of the dynamic obstacle with a voxel filter or the like and stores the extracted sensor data considering the resolution of the submap.

Note that, in the case of a grid map in general, the mobile body 10 may generate and record time-series information including sensor data of dynamic obstacles in a moving image format. For example, when using a map in a probability grid format, the mobile body 10 restores time-series differential data for each representative point (for example, trajectory node) of a moving route of the mobile body 10 while re-projecting the time-series differential data after submap generation and records the restored time-series differential data as a moving image.

The mobile body 10 may store a point group of the sensor data of the static obstacle in the submap, the moving route of the mobile body 10 in the submap, and a point group of the sensor data of the dynamic obstacle added with time in the submap in association with one another. At this time, when restoring a submap at a certain time, the mobile body 10 superimposes a point group of the sensor data of the dynamic obstacle at the certain time on the point group of the sensor data of the static obstacle in the submap.

Figure 3:
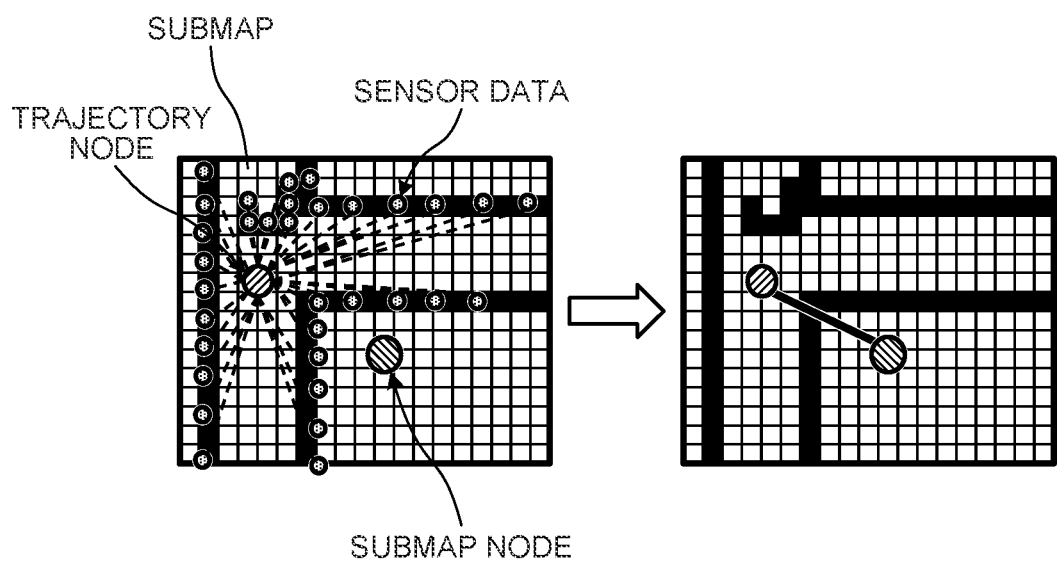
FIG. 3 is a diagram for explaining an overview of submap-trajectory matching processing according to the embodiment.

Subsequently, an overview of submap-trajectory matching processing according to the embodiment is explained with reference to FIG. 3. As illustrated in FIG. 3, the information processing apparatus 100 matches a submap based on sensor data observed by a certain mobile body 10-1 and sensor data observed by another mobile body 10-2 on a trajectory while aligning times of the sensor data. Specifically, the information processing apparatus 100 superimposes the sensor data observed by the other mobile body 10-1 on the submap based on the sensor data observed by the certain mobile body 10-2 while aligning times of the sensor data. Subsequently, the information processing apparatus 100 matches a relative positional relation between a submap node located in the center of the submap of the certain mobile body 10-1 and the trajectory node of the other mobile body 10-2, rotates or translates the submap and the trajectory node each other to be consistent as a whole (such that the position of an obstacle in the submap and the position of the sensor data match), and generates a more accurate map.

Figure 4:
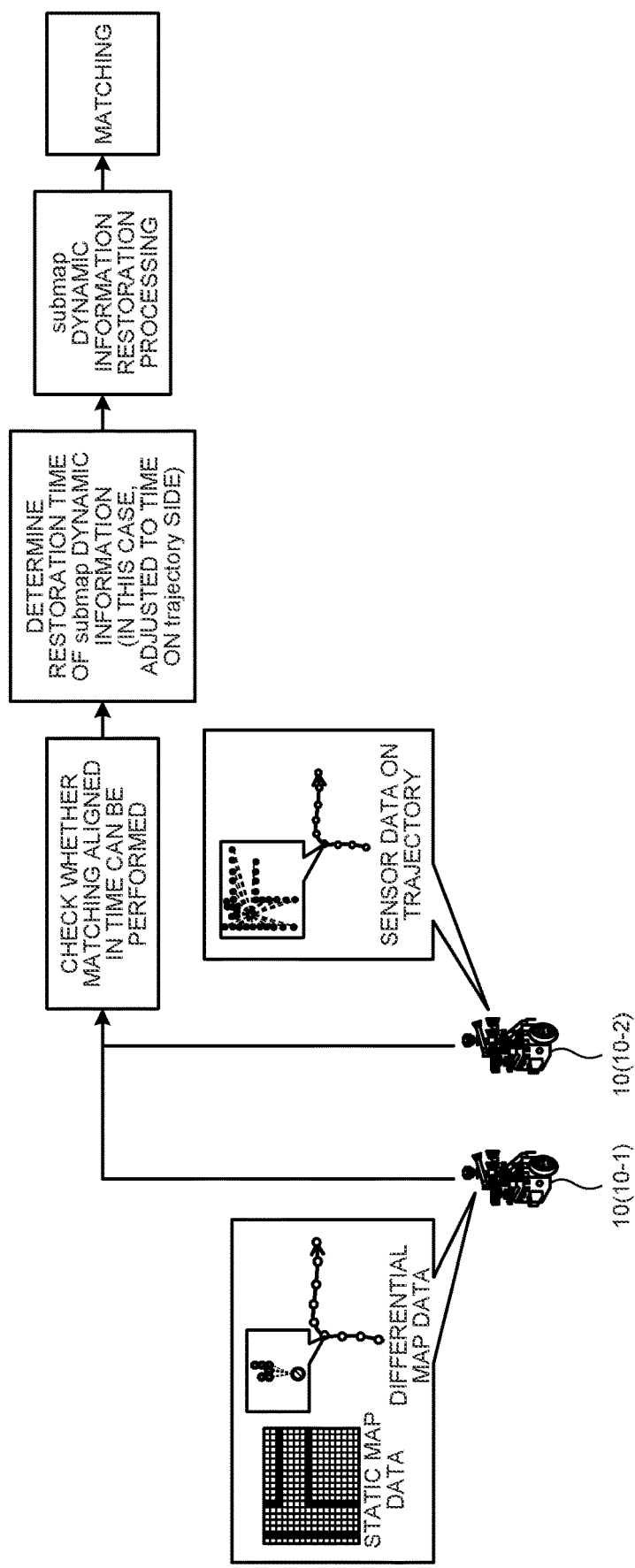
FIG. 4 is a flowchart illustrating an example of the submap-trajectory matching processing according to the embodiment.
Figure 5:
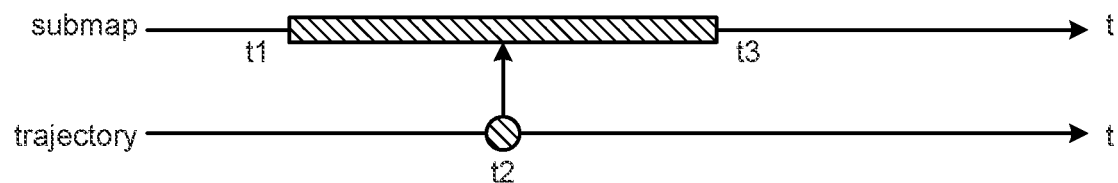
FIG. 5 is a diagram for explaining matching time between a submap and a trajectory according to the embodiment.

Subsequently, a flow of submap-trajectory matching processing according to the embodiment is explained with reference to FIG. 4. As illustrated in FIG. 4, first, the information processing apparatus 100 determines whether matching aligned in time is possible. Here, matching time between a submap and a trajectory according to the embodiment is explained with reference to FIG. 5. The upper part of FIG. 5 illustrates width (t1 to t3) of an observation time of sensor data included in a submap based on the sensor data observed by the certain mobile body 10-1. The lower part of FIG. 5 illustrates time t2 at an instance when the other mobile body 10-2 observes sensor data at a certain point on a trajectory. As illustrated in FIG. 5, in the submap-trajectory matching processing, since the sensor data on the trajectory is data at a certain moment, the information processing apparatus 100 needs to perform matching according to time of the sensor data on the trajectory. Specifically, the information processing apparatus 100 determines whether observation time of the sensor data at in a trajectory node on a trajectory of the other mobile body 10-2 is included in the width of observation time of the sensor data included in the submap of the certain mobile body 10-1. When determining that the observation time of the sensor data in the trajectory node on the trajectory of the other mobile body 10-2 is included in the width of the observation time of the sensor data included in the submap of the certain mobile body 10-1, the information processing apparatus 100 determines that matching trajectory is possible. In an example illustrated in FIG. 5, since observation time t2 of the sensor data in the trajectory node on the trajectory of the other mobile body 10-2 is included in the width (t1 to t3) of the observation time of the sensor data included in the submap of the certain mobile body 10-1, the information processing apparatus 100 determines that the matching trajectory is possible.

FIG. 4 is referred to again. When determining that the matching trajectory is possible, the information processing apparatus 100 determines restoration time of dynamic information in the submap based on the sensor data observed by the certain mobile body 10-1. Specifically, the information processing apparatus 100 determines observation time of the sensor data on the trajectory of the other mobile body 10-2 as the restoration time of the dynamic information of the submap. Subsequently, after determining the restoration time, the information processing apparatus 100 restores a dynamic map including the dynamic information at the restoration time. Subsequently, after restoring the dynamic map at the restoration time of the certain mobile body 10-1, the information processing apparatus 100 matches a relative positional relation between a submap node located in the center of the submap of the certain mobile body 10-1 and the trajectory node of the other mobile body 10-2, rotates or translates the submap and the trajectory node each other to be consistent as a whole (such that the position of an obstacle in the submap and the position of the sensor data match), and generates a more accurate map.

Figure 6:
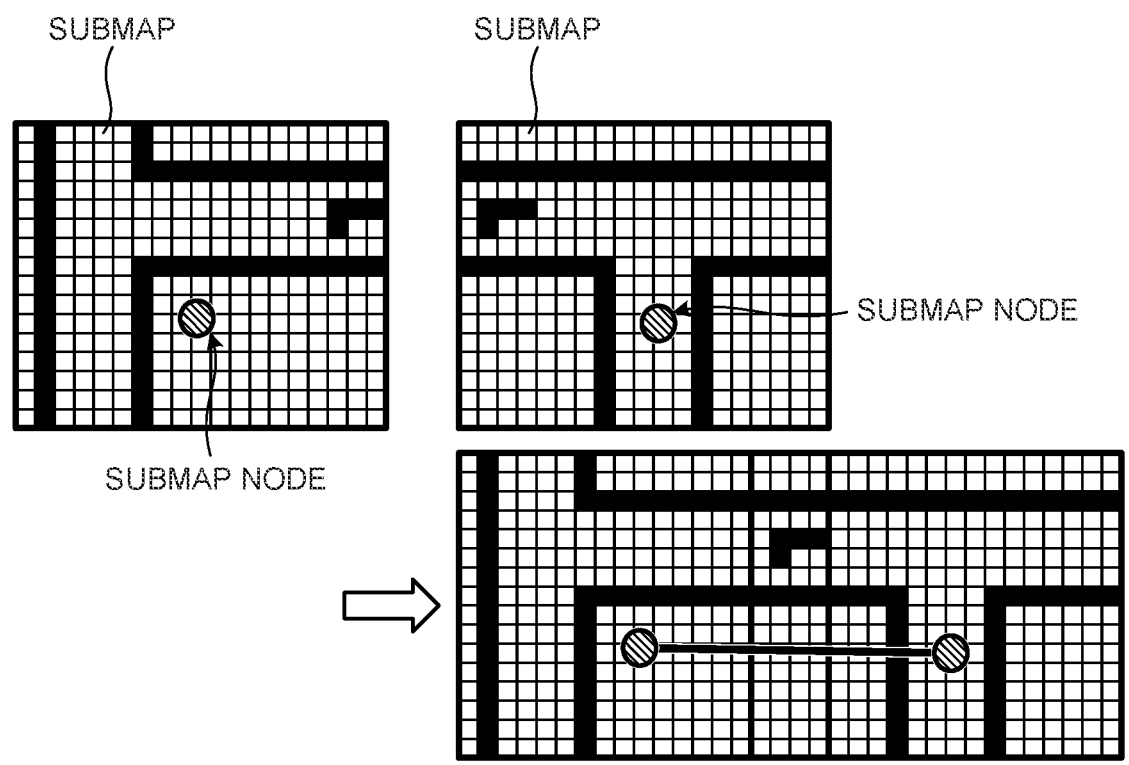
FIG. 6 is a diagram for explaining an overview of submap-submap matching processing according to the embodiment.

Subsequently, an overview of submap-submap matching processing according to the embodiment is explained with reference to FIG. 6. As illustrated in FIG. 6, the information processing apparatus 100 matches a submap based on sensor data observed by the certain mobile body 10-1 and a submap based on sensor data observed by the other mobile body 10-2 while aligning times. Specifically, the information processing apparatus 100 superimposes the submap based on the sensor data observed by the other mobile body 10-2 on the submap based on the sensor data observed by the certain mobile body 10-1 while aligning times. Subsequently, the information processing apparatus 100 matches a relative positional relation between a submap node located in the center of a submap of the certain mobile body 10-1 and a submap node located in the center of a submap of the other mobile body 10-2, rotates or translates the submap of the certain mobile body 10-1 and the submap of the other mobile body 10-2 to be consistent with each other as a whole (such that the position of an obstacle in the submap of the certain mobile body 10-1 matches the position of an obstacle in the submap of the other mobile body 10-2), and generates a more accurate map.

Figure 7:
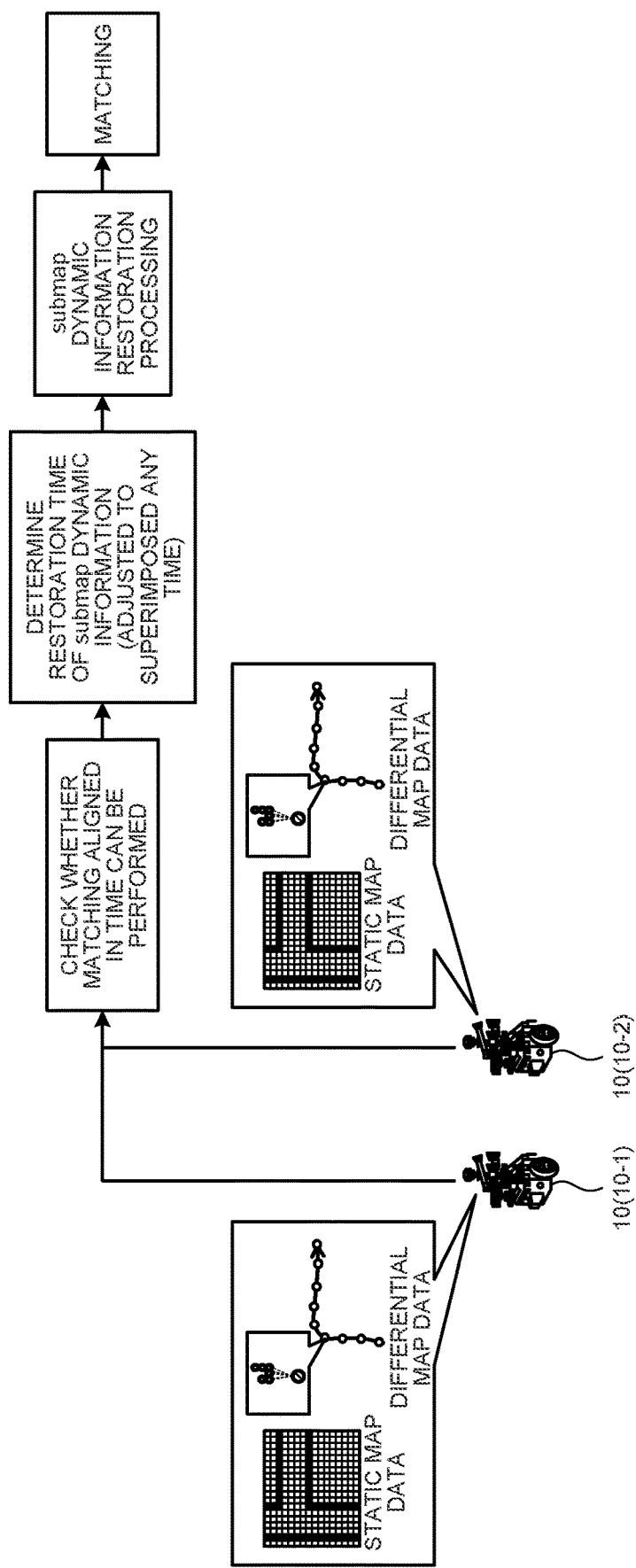
FIG. 7 is a flowchart illustrating an example of the submap-submap matching processing according to the embodiment.
Figure 8:
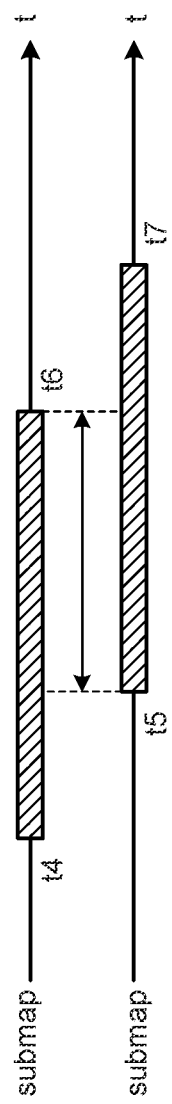
FIG. 8 is a diagram for explaining matching time between a submap and a submap according to the embodiment.

Subsequently, a flow of submap-submap matching processing according to the embodiment is explained with reference to FIG. 7. As illustrated in FIG. 7, first, the information processing apparatus 100 determines whether matching aligned in time is possible. Here, matching time between a submap and a submap according to the embodiment is explained with reference to FIG. 8. The upper part of FIG. 8 illustrates width (t4 to t6) of an observation time of sensor data included in a submap based on sensor data observed by the certain mobile body 10-1. The lower part of FIG. 8 illustrates width (t5 to t7) of an observation time of sensor data included in a submap based on sensor data observed by the other mobile body 10-2. As illustrated in FIG. 8, in the submap-submap matching processing, the information processing apparatus 100 needs to perform matching according to some time in a time period in which the observation times of the sensor data included in the two submaps overlap. Specifically, the information processing apparatus 100 determines whether an observation time period of the sensor data included in the submap of the certain mobile body 10-1 overlaps and an observation time period of the sensor data included in the submap of the other mobile body 10-2 overlap. When determining that the observation time period of the sensor data included in the submap of the certain mobile body 10-1 and the observation time period of the sensor data included in the submap of the other mobile body 10-2 overlap, the information processing apparatus 100 determines that the matching trajectory is possible. In an example illustrated in FIG. 8, since the observation time period of the sensor data included in the submap of the certain mobile body 10-1 and the observation time period of the sensor data included in the submap of the other mobile body 10-2 overlap at times t5 to t6, the information processing apparatus 100 determines that matching trajectory is possible.

FIG. 7 is referred to again. When determining that the matching trajectory is possible, the information processing apparatus 100 determines restoration time of dynamic information in the submaps based on the sensor data observed by both the mobile bodies. Specifically, the information processing apparatus 100 determines predetermined time included in a time period in which the observation time periods of the sensor data included in the submaps of both the mobile bodies overlap as the restoration time of the dynamic information of the submaps. For example, the information processing apparatus 100 determines, as the restoration time, time of an instance when both the mobile bodies come closest to each other. Here, as robots are closer, possibility of an effective dynamic object being observed in an overlapping region that can be used for matching is higher. Subsequently, after determining the restoration time, the information processing apparatus 100 restores dynamic maps of both the mobile bodies including the dynamic information at the restoration time. Subsequently, after restoring the dynamic maps of both the mobile bodies, the information processing apparatus 100 matches a relative positional relation between a submap node located in the center of the dynamic map of the certain mobile body 10-1 and a submap node located in the center of the dynamic map of the other mobile body 10-2, rotates or translates the dynamic map of the certain mobile body 10-1 and the dynamic map of the other mobile body 10-2 to be consistent with each other as a whole (such that the position of an obstacle in the dynamic map of the certain mobile body 10-1 matches the position of an obstacle in the dynamic map of the other mobile body 10-2), and generates a more accurate map.

The information processing apparatus 100 restores the dynamic maps of both the mobile bodies at a plurality of times included in a time period in which observation time periods of the sensor data included in the submaps of both the mobile bodies overlap, executes matching a plurality of times, and uses an average in the matching performed a plurality of times or removes an outlier. Consequently, the information processing apparatus 100 sometimes performs erroneous matching in one matching but can perform more robust matching by performing the matching a plurality of times.

Figure 9:
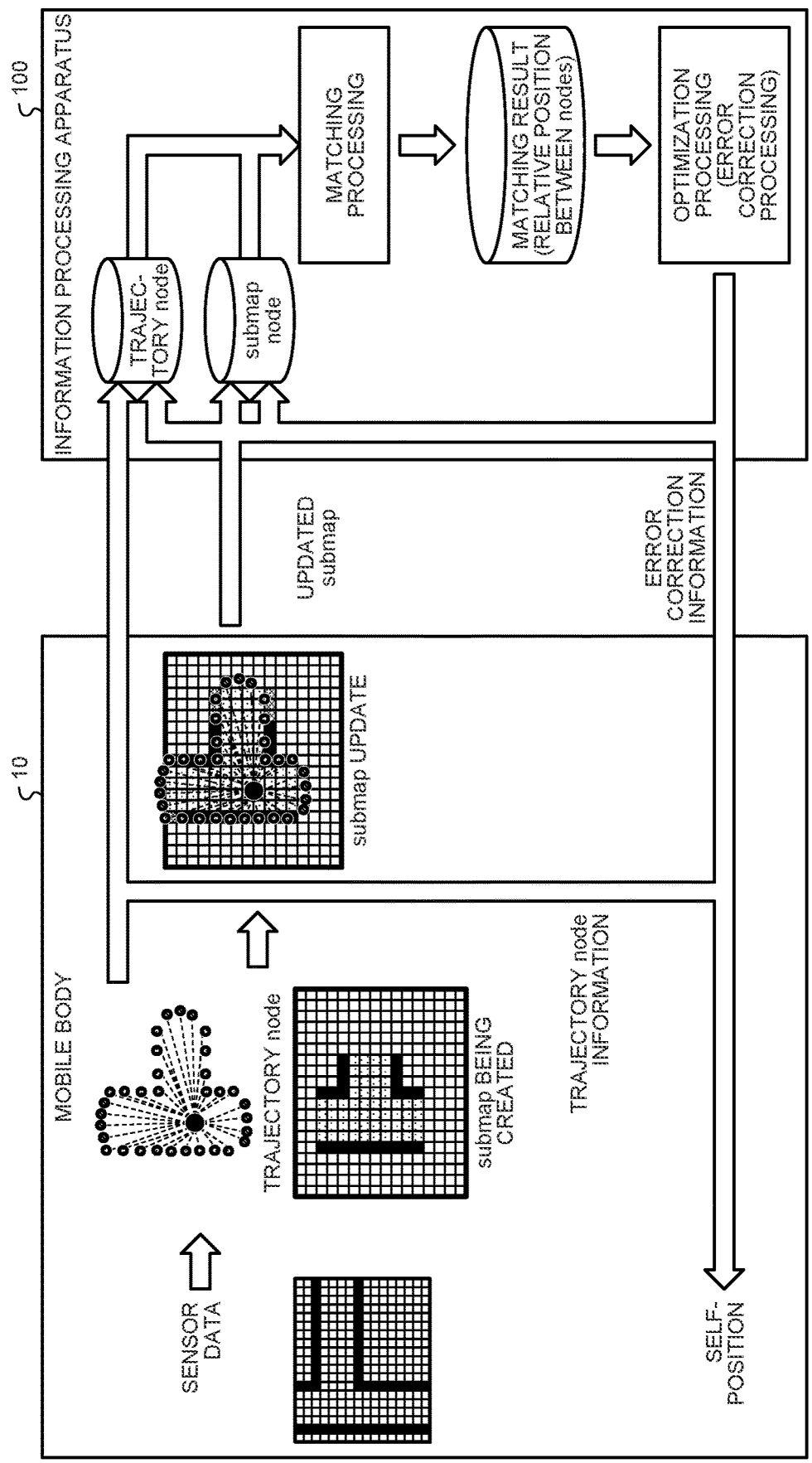
FIG. 9 is a diagram for explaining an example of self-position estimation processing according to the embodiment.

Subsequently, an example of self-position estimation processing according to the embodiment is explained with reference to FIG. 9. In FIG. 9, self-position estimation processing using a submap is explained. In FIG. 9, an example in which a self-position is estimated based on a more accurate map generated by submap-trajectory matching processing is explained. Specifically, the information processing apparatus 100 assumes that no error is included in a submap, which is a small map, matches a relative positional relation between the submap and a trajectory node, rotates or translates the submap and the trajectory node to be consistent with each other as a whole, and estimates a more accurate map and a more accurate self-position.

The processing illustrated in FIG. 9 is performed by the mobile body 10 and the information processing apparatus 100. More specifically, when new sensor data is input, the mobile body 10 generates a trajectory node corresponding to a position of the mobile body 10, which has observed the sensor data, and sequentially updates the submap. After generating the trajectory node, the mobile body 10 registers the generated trajectory node in the information processing apparatus 100. The mobile body 10 also updates the submap for a certain time and, thereafter, registers the updated submap in the information processing apparatus 100. Here, the mobile body 10 performs extraction processing for time-series differential data when registering the updated submap.

The information processing apparatus 100 performs the matching processing for matching a relative positional relation between a submap node of the certain mobile body 10-1 (a node regarded as being located in the center of the submap) and a trajectory node of the other mobile body 10-2. Here, when performing the matching processing, the information processing apparatus 100 restores dynamic information of the submap according to a combination of the matching and performs the matching processing using the submap in which the dynamic information is restored. More specifically, the information processing apparatus 100 calculates a relative positional relation between the submap node of the certain mobile body 10-1 and the trajectory node of the other mobile body 10-2.

Subsequently, the information processing apparatus 100 corrects errors in the positions of all nodes such that relative positional relations between all submap nodes and all trajectory nodes are consistent. Subsequently, the information processing apparatus 100 outputs a more accurate map optimized by correcting errors in the positions of all the nodes to the mobile body 10. The mobile body 10 estimates a self-position based on the more accurate map output from the information processing apparatus 100.

Figure 10:
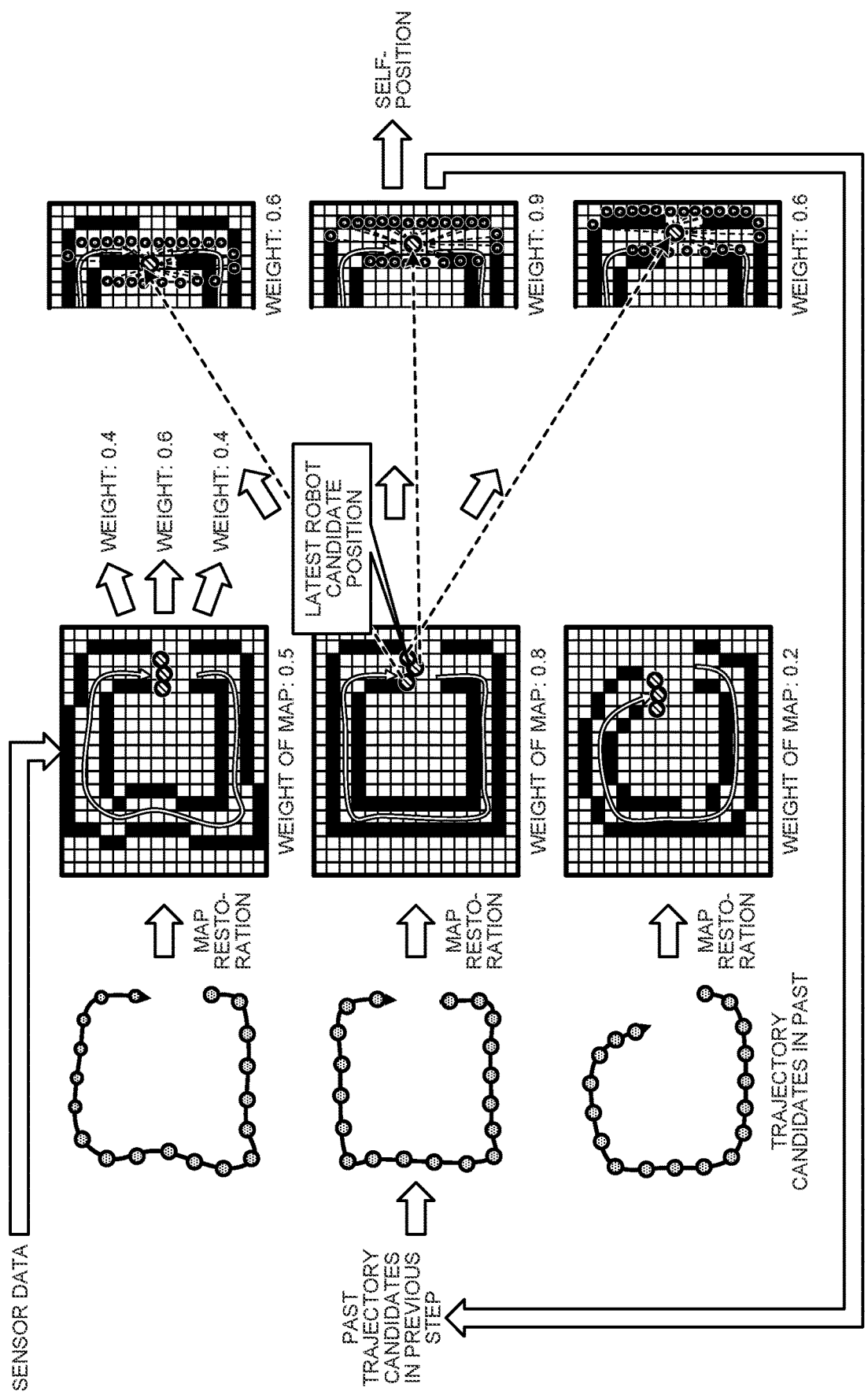
FIG. 10 is a diagram for explaining an example of self-position estimation processing according to a modification of the embodiment.

Subsequently, an example of self-position estimation processing according to a modification of the embodiment is explained with reference to FIG. 10. In FIG. 10, self-position estimation processing not using a submap is explained. Specifically, the information processing apparatus 100 constantly evaluates and continuously updates candidates of a plurality of maps and a plurality of self-positions and outputs a map and a self-position a best evaluation result at each time (a map and a self-position successfully matched) as a map and a self-position at that time.

The processing illustrated in FIG. 10 is carried out by the mobile body 10 and the information processing apparatus 100. More specifically, the information processing apparatus 100 retains a plurality of hypotheses using candidates of a map and candidates of the latest robot position (hereinafter referred to as self-position as well) respectively as particles. At this time, the information processing apparatus 100 performs the restoration processing for dynamic information in the vicinities of the latest robot position candidates. In an example illustrated in FIG. 10, the information processing apparatus 100 generates particles of three map candidates and three latest robot position candidates based on the three trajectory candidates in the past and the latest sensor data in the previous step. At this time, weights are respectively given to the three map position candidates and the three latest robot position candidates. In the example illustrated in FIG. 10, the weight of a map candidate in the upper part is 0.5, the weight of a map candidate in the middle part is 0.8, and the weight of a map candidate in the lower part is 0.2. The weights of the three latest robot position candidates (indicated by circles) included in the map candidates are 0.4 on the left, 0.6 in the center, and 0.4 on the right.

Subsequently, the information processing apparatus 100 superimposes the sensor data of the robot position candidates on the maps and updates the weights of the maps and the weights of the robot position candidates. The information processing apparatus 100 gives a larger weight as a degree of matching between the position of an obstacle on a map and sensor data is larger. In the example illustrated in FIG. 10, the weight of the map candidate in the upper part is updated from 0.5 to 0.6, the weight of the map candidate in the middle part is updated from 0.8 to 0.9, and the weight of the map candidate in the lower part is updated from 0.2 to 0.6. Subsequently, the information processing apparatus 100 outputs a map candidate and a robot position candidate having the largest weight as a correct map and a correct robot position at that time. In the example illustrated in FIG. 10, the information processing apparatus 100 outputs a map in the middle part having the largest weight among the three map candidates as a correct map. The information processing apparatus 100 outputs a robot position in the center having the largest weight among the three robot position candidates as a correct robot position.

The information processing apparatus 100 retains candidates having fixed or more weight in order to apply the processing to the next sensor data. In the example illustrated in FIG. 10, the information processing apparatus 100 superimposes the sensor data of the robot position in the center having the largest weight on the map in the middle part having the largest weight among the three map candidates and extracts time-series differential data. The information processing apparatus 100 stores static map data and time-series differential data of the map in the middle part having the largest weight. The information processing apparatus 100 transmits the output correct map and the output correct robot position to the mobile body 10.

2-2. Configuration of the Information Processing System

Subsequently, a schematic configuration example of the information processing system according to the embodiment is explained with reference to FIG. 11. As illustrated in FIG. 11, the information processing system 1 according to the embodiment has a server-client configuration. As illustrated in FIG. 11, the information processing system 1 includes the information processing apparatus 100 and a plurality of mobile bodies 10.

Specifically, the mobile body 10 observes sensor data with various sensors mounted on the mobile body 10 while moving. The mobile body 10 generates a submap and a trajectory node based on the sensor data. The mobile body 10 uploads data of the generated submap and the generated trajectory node to the information processing apparatus 100. The information processing apparatus 100 acquires data of a submap and a trajectory node from each of the plurality of mobile bodies 10. The information processing apparatus 100 performs, based on the data acquired from each of the plurality of mobile bodies 10, submap-trajectory matching processing or submap-submap matching processing and error correction for a map. The information processing apparatus 100 distributes a result of the error correction to each of the plurality of mobile bodies 10 in downstream. Each of the mobile bodies 10 estimates a self-position based on the result received from the information processing apparatus 100.

Figure 12:
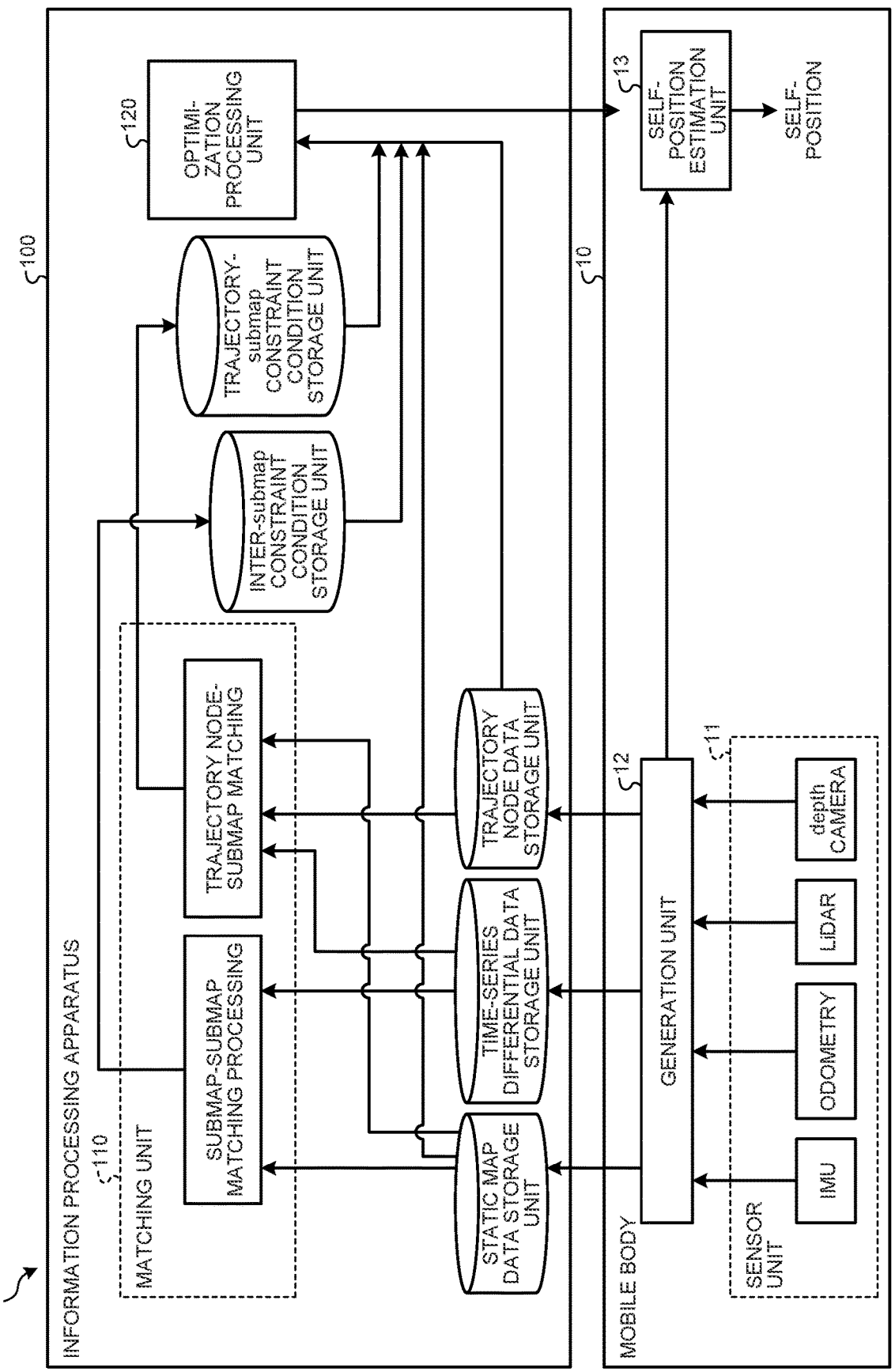
FIG. 12 is a block diagram illustrating a schematic configuration example of an information processing system according to the embodiment.

Subsequently, a block illustrating a schematic configuration example of the information processing system according to the embodiment is explained with reference to FIG. 12. As illustrated in FIG. 12, the information processing system 1 according to the embodiment includes the information processing apparatus 100 and the mobile body 10.

(Information Processing Apparatus 100)

The information processing apparatus 100 includes a communication unit, a storage unit, and a control unit. Note that the information processing apparatus 100 may include an input unit (for example, a keyboard or a mouse) that receives various kinds of operation from an administrator or the like of the information processing apparatus 100 and a display unit (for example, a liquid crystal display) for displaying various kinds of information.

(Communication Unit)

The communication unit is realized by, for example, an NIC (Network Interface Card). The communication unit is connected to a network by wire or radio and transmits and receives information to and from the mobile body 10.

(Storage Unit)

The storage unit is realized by, for example, a semiconductor memory element such as a RAM (Random Access Memory) or a flash memory or a storage device such as a hard disk or an optical disk. The storage unit includes a static map data storage unit, a time-series differential data storage unit, a trajectory node data storage unit, an inter-submap constraint condition storage unit, and a trajectory-submap constraint condition storage unit illustrated in FIG. 12.

The static map data storage unit stores various kinds of information related to static map data. Specifically, the static map data storage unit stores static map data illustrated in FIG. 19 explained below.

The time-series differential data storage unit stores various kinds of information concerning time-series differential data. Specifically, the time-series differential data storage unit stores time-series differential data illustrated in FIG. 20 explained below.

The trajectory node data storage unit stores various kinds of information concerning trajectory node data. Specifically, the trajectory node data storage stores trajectory node data illustrated in FIG. 21 explained below.

The inter-submap constraint condition storage unit stores various kinds of information concerning constraint conditions between a submap and a submap. Specifically, the inter-submap constraint condition storage unit stores constraint conditions between a submap and a submap illustrated in FIG. 23 explained below.

The trajectory-submap constraint condition storage unit stores various kinds of information concerning trajectory-submap constraint conditions. Specifically, the trajectory-submap constraint condition storage unit stores trajectory-submap constraint conditions illustrated in FIG. 24 explained below.

(Control Unit)

The control unit is a controller and is realized by, for example, a CPU (Central Processing Unit), an MPU (Micro Processing Unit), or the like executing various programs (equivalent to an example of an information processing program) stored in a storage device inside the information processing apparatus 100 using a RAM as a work area. The control unit is a controller and is realized by, for example, an integrated circuit such as an ASIC (Application Specific Integrated Circuit) or an FPGA (Field Programmable Gate Array).

The control unit includes a matching unit 110 and an optimization processing unit 120 and realizes or executes action of information processing explained below. Note that the internal configuration of the control unit is not limited to the configuration illustrated in FIG. 12 and may be another configuration if the control unit is configured to perform information processing explained below.

(Matching Unit 110)

The matching unit 110 restores a submap including the dynamic information at any time in order to realize matching using a dynamic obstacle. Specifically, after determining the restoration time of the submap, the matching unit 110 superimposes time-series differential data of the restoration time on static map data. Subsequently, the matching unit 110 restores a submap at any time including both a dynamic obstacle and a static obstacle based on the time-series differential data superimposed on the static map data.

The matching unit 110 performs submap-trajectory matching processing. Specifically, the matching unit 110 matches a submap based on sensor data observed by the certain mobile body 10-1 and sensor data observed by the other mobile body 10-2 at a trajectory node with times aligned. In this way, the matching unit 110 matches a relative positional relation between partial map information and trajectory position information based on partial map information including position information of a moving object at predetermined time retained by the mobile body 10-1, point group information indicating a position of the moving object at predetermined time retained by the other mobile body 10-2, and trajectory position information indicating a position on a trajectory of the other mobile body 10-2. More specifically, when a new submap or a new trajectory node is added, the matching unit 110 lists combinations of submaps and trajectory nodes to be matched.

Subsequently, after listing matching targets, the matching unit 110 determines whether matching aligned in time is possible for combinations included in the list. For example, the matching unit 110 determines whether observation time of sensor data in the trajectory node on the trajectory of the other mobile body 10-2 is included in the width of an observation time of the sensor data included in the submap of the certain mobile body 10-1. When determining that the observation time of the sensor data in the trajectory node on the trajectory of the other mobile body 10-2 is included in the width of the observation time of the sensor data included in the submap of the certain mobile body 10-1, the matching unit 110 determines that matching aligned in time is possible.

Subsequently, when determining that matching aligned in time is possible, the matching unit 110 determines matching time. Specifically, the matching unit 110 determines the observation time of the sensor data in the trajectory node of the other mobile body 10-2 as the matching time. Subsequently, after determining the matching time, the matching unit 110 restores the submap of the certain mobile body 10-1 including the dynamic information at the matching time based on the time-series differential data at the matching time. In this way, the matching unit 110 restores partial map information including the position of a moving object at predetermined time retained by the mobile body 10-1 by superimposing the point group information extracted by the generation unit 12 on the static partial map information. Subsequently, after restoring the submap at the matching time of the certain mobile body 10-1, the matching unit 110 superimposes sensor data in the trajectory node of the other mobile body 10-2 on the restored submap of the mobile body 10-1. Subsequently, the matching unit 110 matches a relative positional relation between a submap node located in the center of the submap of the certain mobile body 10-1 and the trajectory node of the other mobile body 10-2, rotates or translates the submap and the trajectory node to be consistent with each other as a whole (such that the position of an obstacle in the submap and the position of the sensor data match), and generates a more accurate map.

Subsequently, after executing the matching, the matching unit 110 generates submap-trajectory constraint conditions based on a matching result. In this way, the matching unit 110 generates second constraint conditions (submap-trajectory constraint conditions) indicating a relative positional relation between the trajectory position information and the partial map information by matching a relative positional relation between the trajectory position information and the partial map information. After generating the submap-trajectory constraint conditions, the matching unit 110 stores the generated submap-trajectory constraint conditions. Subsequently, after storing the submap-trajectory constraint conditions, the matching unit 110 updates the matching target list. Specifically, the matching unit 110 excludes, from the list, a combination of the submap and the trajectory node for which the matching is completed.

The matching unit 110 performs submap-submap matching processing. Specifically, the matching unit 110 performs matching a submap based on sensor data observed by the certain mobile body 10-1 and a submap based on sensor data observed by the other mobile body 10-2 with times aligned. In this way, the matching unit 110 matches a relative positional relation between the partial map information and the other partial map information based on the partial map information including the position information of the moving object at the predetermined time retained by the mobile body 10-1 and the other partial map information including the position information of the moving object at the predetermined time retained by the other mobile body 10-2. More specifically, when a new submap is added, a combination of submaps to be matched is listed.

Subsequently, after listing matching targets, the matching unit 110 determines whether matching aligned in time is possible for combinations included in the list. For example, the matching unit 110 determines whether an observation time period of the sensor data included in the submap of the certain mobile body 10-1 and an observation time period of the sensor data included in the submap of the other mobile body 10-2 overlap. When determining that the observation time period of the sensor data included in the submap of the certain mobile body 10-1 and the observation time period of the sensor data included in the submap of the other mobile body 10-2 overlap, the matching unit 110 determines that matching aligned in time is possible.

Subsequently, when determining that matching aligned in time is possible, the matching unit 110 determines matching time. Specifically, the matching unit 110 determines, as the matching time, predetermined time included in a time period in which the observation time periods of the sensor data included in the submaps of both the mobile bodies overlap. For example, the matching unit 110 determines, as the matching time, time of an instance when both the mobile bodies come closest to each other. Subsequently, after determining the matching time, the matching unit 110 restores submaps of both the mobile bodies including dynamic information at the matching time. For example, the matching unit 110 the matching unit 110 restores the partial map information including the position of the moving object at the predetermined time retained by the mobile body 10-1 by superimposing the point group information extracted by the generation unit 12 on the static partial map information. The matching unit 110 restores the other partial map information including the position of the moving object at the predetermined time retained by the other mobile body 10-2 by superimposing the point group information extracted by the generation unit 12 on the static partial map information.

Subsequently, after restoring the submap at the matching time of both the mobile bodies, the matching unit 110 superimposes the submap of the other mobile body 10-1 on the restored submap of the mobile body 10-2. Subsequently, the matching unit 110 matches a relative positional relation between a submap node located in the center of the submap of the certain mobile body 10-1 and a submap node located in the center of the submap of the other mobile body 10-2, rotates or translates the submap of the certain mobile body 10-1 and the submap of the other mobile body 10-2 to be consistent as a whole (such that the position of an obstacle in the dynamic map of the certain mobile body 10-1 matches the position of an obstacle in the dynamic map of the other mobile body 10-2), and generates a more accurate map.

The matching unit 110 restores the dynamic maps of both the mobile bodies at a plurality of times included in a time period in which observation time periods of the sensor data included in the submaps of both the mobile bodies overlap, executes matching a plurality of times, and uses an average inf the plurality of times of matching or removes an outlier.

Subsequently, after executing the matching, the matching unit 110 generates submap-submap constraint conditions based on a matching result. In this way, the matching unit 110 generates first constraint condition information (submap-submap constraint conditions) indicating a relative positional relation between the partial map information and the other partial map information by matching the relative positional relation between the partial map information and the other partial map information. After generating the submap-submap constraint conditions, the matching unit 110 stores the generated submap-submap constraint conditions. Subsequently, after storing the submap-submap constraint conditions, the matching unit 110 updates the matching target list. Specifically, the matching unit 110 excludes a combination of submaps for which the matching is completed from the list.

(Optimization Processing Unit 120)

The optimization processing unit 120 corrects an error of map data based on the submap-trajectory constraint conditions and the submap-submap constraint conditions generated by the matching unit 110. Specifically, the optimization processing unit 120 generates, based on the trajectory node data, the static map data, and the submap-trajectory constraint conditions, map data in which an error in a relative positional relation between a trajectory node and a submap node of static map data is corrected.

The optimization processing unit 120 generates, based on the static map data and the submap-submap constraint condition, map data in which an error in a relative positional relation between submap nodes of a plurality of static map data is corrected. In this way, the optimization processing unit 120 corrects, based on a matching result by the matching unit 110, an error of entire map information constructed by combining a plurality of kinds of partial map information. For example, the optimization processing unit 120 corrects the error of the entire map information based on the first constraint condition information (the submap-submap constraint conditions) generated by the matching unit 110. After generating the map data in which the error is corrected, the optimization processing unit 120 outputs the generated map data to the mobile body 10.

The optimization processing unit 120 corrects, based on the matching result by the matching unit 110, an error of entire trajectory position information of a predetermined mobile body 10 constructed by combining trajectory position information indicating a position on a trajectory of the predetermined mobile body 10. For example, the optimization processing unit 120 corrects the error of the entire trajectory position information based on the second constraint conditions (the submap-trajectory constraint condition) generated by the matching unit 110.

(Mobile Body 10)

The mobile body 10 includes a communication unit, a sensor unit 11, and a control unit. The mobile body 10 may include a communication unit that transmits and receives information to and from the information processing apparatus 100.

(Communication Unit)

The communication unit is realized by, for example, an NIC. Then, the communication unit is connected to a network by wire or radio and transmits and receives information to and from the information processing apparatus 100.

(Sensor Unit 11)

The sensor unit 11 includes a LiDAR, a depth camera, an IMU, and odometry. Note that, as the number of types of the sensors of the sensor unit 11 is increased, the performance of the sensors is complemented with one another to improve the accuracy of the SLAM. However, only a part of the sensors can operate. For example, both the LiDAR and the depth camera are sensors that scan the outside. However, only one of the LiDAR and the depth camera can operate. In addition, the IMU and the odometry are sensors that acquire how a mobile body has moved in a very short time. However, since how the mobile body has moved in a very short time can be estimated from a change amount of observation data of a camera, the sensor unit 11 can operate even if the IMU and the odometry are removed.

The LiDAR senses surrounding two-dimensional or three-dimensional point group data (a coordinate of points). Specifically, the LiDAR outputs LiDAR data illustrated in FIG. 13 explained below.

The depth camera simultaneously senses a surrounding image and distance information. Specifically, the depth camera outputs depth camera data illustrated in FIG. 14 explained below.

The IMU detects angles and accelerations of three axes that govern the motion of the mobile body 10. Specifically, the IMU outputs IMU data illustrated in FIG. 15 explained below.

The odometry estimates a moving amount and speed from a rotation angle of a wheel or the like of the mobile body 10. Specifically, the odometry outputs odometry data illustrated in FIG. 16 explained below.

(Control Unit)

The control unit is a controller and is realized by, for example, a CPU or an MPU executing various programs (equivalent to an example of an information processing program) stored in a storage device inside the mobile body 10 using a RAM as a work area. The control unit is a controller and is realized by an integrated circuit such as an ASIC or an FPGA.

The control unit includes a generation unit 12 and a self-position estimation unit 13 and realizes or executes an action of information processing explained below. Note that the internal configuration of the control unit is not limited to the configuration illustrated in FIG. 12 and may be another configuration if the control unit is configured to perform information processing explained below.

(Generation Unit 12)

The generation unit 12 acquires sensor data from the sensor unit 11. Specifically, the generation unit 12 acquires output data of the IMU from the IMU. The generation unit 12 acquires output data of the odometry from the odometry. The generation unit 12 acquires output data of the LiDAR from LiDAR. The generation unit 12 acquires output data of the depth camera from the depth camera.

The generation unit 12 generates static map data based on the sensor data acquired from the sensor unit 11. Specifically, when acquiring the output data of the LiDAR and the output data of the depth camera, the generation unit 12 generates static map data based on the output data of the LiDAR and the output data of the depth camera. After generating the static map data, the generation unit 12 uploads the generated static map data to the information processing apparatus 100.

The generation unit 12 generates trajectory node data based on the sensor data acquired from the sensor unit 11. Specifically, when acquiring the output data of the IMU and the output data of the odometry, the generation unit 12 generates the trajectory node data based on the output data of the IMU and the output data of the odometry. After generating the static map data, the generation unit 12 corrects a very small error of the trajectory node data based on the generated static map data. After correcting the very small error of the trajectory node data, the generation unit 12 uploads the trajectory node data after the correction of the very small error to the information processing apparatus 100.

The generation unit 12 extracts time-series differential data based on the sensor data acquired from the sensor unit 11. Specifically, after generating the static map data, the generation unit 12 extracts the time-series differential data in trajectory nodes included in the static map data based on the generated static map data, the trajectory node data after the correction of the very small error, and the sensor data such as the output data of the LiDAR. More specifically, at the timing when the static map data is generated, the generation unit 12 superimposes, on the static map data, sensor data observed in a trajectory node on a moving route of the generation unit 12 that has moved in a region included in the static map data. Subsequently, the generation unit 12 extracts sensor data of a dynamic obstacle by removing sensor data superimposed on a grid on which a static obstacle is located on the static map data from the sensor data superimposed on the static map data. The generation unit 12 sets the extracted sensor data as time-series differential data. In this way, the generation unit 12 superimposes point group information indicating a position of an object at predetermined time retained by the mobile body 10 on static partial map information including position information of a static object and removes the point group information superimposed on the position of the static object included in the static partial map information from the superimposed point group information to extract the point group information indicating the position of a moving object at the predetermined time retained by the mobile body 10. Similarly, the generation unit 12 extracts sensor data of dynamic obstacles observed in trajectory nodes included in the static map data. After extracting the time-series differential data, the generation unit 12 uploads the extracted time-series differential data to the information processing apparatus 100.

The generation unit 12 generates self-position data in a Local coordinate system based on the sensor data acquired from the sensor unit 11. Specifically, when acquiring the output data of the IMU and the output data of the odometry, the generation unit 12 generates self-position data in the Local coordinate system based on the output data of the IMU and the output data of the odometry. After generating the self-position data in the Local coordinate system, the generation unit 12 outputs the generated self-position data in the Local coordinate system to the self-position estimation unit 13.

(Self-Position Estimation Unit 13)

The self-position estimation unit 13 estimates a self-position of the mobile body 10. The self-position estimation unit 13 estimates a self-position of the mobile body 10 based on information concerning the position of the moving object at the predetermined time retained by the mobile body 10 and information concerning the position of the moving object at the predetermined time retained by the other mobile body. Specifically, the self-position estimation unit 13 estimates the self-position of the mobile body 10 based on the partial map information including the position information of the moving object at the predetermined time retained by the mobile body 10 and the other partial map information including the position information of the moving object at the predetermined time retained by the other mobile body. More specifically, the self-position estimation unit 13 estimates the self-position of the mobile body 10 based on the matching result by the matching unit 110. For example, the self-position estimation unit 13 estimates the self-position of the mobile body 10 based on the entire map information in which the error is corrected by the optimization processing unit 120.

The self-position estimation unit 13 estimates the self-position of the mobile body 10 based on the partial map information including the position information of the moving object at the predetermined time retained by the mobile body 10, the point group information indicating the position of the moving object at the predetermined time retained by the other mobile body, and the trajectory position information indicating the position of the other mobile body on the trajectory. More specifically, the self-position estimation unit 13 estimates the self-position of the mobile body based on the matching result by the matching unit 110. For example, the self-position estimation unit 13 estimates the self-position of the mobile body 10 based on the entire trajectory position information in which the error is corrected by the optimization processing unit 120.

The self-position estimation unit 13 acquires the self-position data in the Local coordinate system from the generation unit 12. The self-position estimation unit 13 acquires the map data after the error correction by the information processing apparatus 100 from the information processing apparatus 100. Subsequently, the self-position estimation unit 13 estimates the self-position based on the self-position data in the Local coordinate system and the map data after error correction.

Subsequently, an example of the output data of the LiDAR according to the embodiment is explained with reference to FIG. 13. As illustrated in FIG. 13, the output data of the LiDAR includes "time", "frequency", and "point cloud". The "time" indicates time when the output data is generated. The "frequency" indicates an output frequency of the point cloud. The "point cloud" indicates surrounding two-dimensional or three-dimensional point group data (co-ordinates of points) and data of generation time of the point group data.

Subsequently, an example of the output data of the depth camera according to the embodiment is explained with reference to FIG. 14. As illustrated in FIG. 14, the output data of the depth camera includes "time", "frequency", "image", and "depth information". The "time" indicates time when the output data is generated. The "frequency" indicates an output frequency of the depth information. The "image" indicates a two-dimensional RGB image. The "depth information" indicates depth information of the image. Note that the "depth information" is sometimes output in a point cloud format.

Subsequently, an example of the output data of the IMU according to the embodiment is explained with reference to FIG. 15. As illustrated in FIG. 15, the output data of the IMU includes "time", "frequency", "orientation", "angular velocity", and "linear acceleration". The "time" indicates time when the output data is generated. The "frequency" indicates an output frequency of the IMU. The "orientation" indicates the orientation of the mobile body 10. The "angular velocity" indicates the angular velocity of the mobile body 10. The "linear acceleration" indicates the acceleration of the mobile body 10.

Subsequently, an example of the output data of the odometry according to the embodiment is explained with reference to FIG. 16. As illustrated in FIG. 16, the output data of the odometry includes "time", "frequency", "pose", and "speed". The "time" indicates time when the output data is generated. The "frequency" indicates an output frequency of the odometry. The "pose" indicates the posture (position and direction) of the mobile body 10 in a track origin coordinate. The "speed" indicates the speed of a translation component and the speed of a rotation component of the mobile body 10.

Subsequently, an example of input data of the generation unit 12 according to the embodiment is explained with reference to FIG. 17. The generation unit 12 outputs output data illustrated in FIG. 18 explained below based on an input of input data illustrated in FIG. 17. As illustrated in FIG. 17, the input data of the generation unit 12 includes "time", "IMU data", "odometry data", "LiDAR data", and "depth camera data". The "time" indicates time when the output data is generated. The "IMU data" indicates the output data of the IMU illustrated in FIG. 15. The "odometry data" indicates the output data of the odometry in FIG. 16. The "LiDAR data" indicates the output data of the LiDAR in FIG. 13. The "depth camera data" indicates the output data of the depth camera in FIG. 14. Note that the "IMU data", the"odometry data", the "LiDAR data", and the "depth camera data" have different periods for each of the data and, therefore, are input to the generation unit 12 independently from one another.

Subsequently, an example of the output data of the generation unit 12 according to the embodiment is explained with reference to FIG. 18. The generation unit 12 outputs output data illustrated in FIG. 18 based on an input of input data illustrated in FIG. 17. As illustrated in FIG. 18, the output data of the generation unit 12 includes "time", "static map data", "trajectory node data", and "time-series differential data". The "time" indicates time when the output data is generated. The "static map data" indicates static map data illustrated in FIG. 19 explained below. The "trajectory node data" indicates static map data illustrated in FIG. 21 explained below. The "time-series differential data" indicates time-series differential data illustrated in FIG. 20 explained below. Note that the "static map data", the"trajectory node data", and the "time-series differential data" have different periods for each of the data and, therefore, are output from the generation unit 12 independently from one another.

Subsequently, an example of static map data according to the embodiment is explained with reference to FIG. 19. As illustrated in FIG. 19, the static map data includes "creation start time", "creation completion time", "submap_id", "posture", "grid resolution", "grid size", and "value list of grids". The "creation start time" indicates a generation start time of the static map data. The "creation completion time" indicates a generation completion time of the static map data. The "submap_id" indicates an ID for identifying the static map data. The "posture" indicates an arrangement posture (position and orientation) on a global map of the center (for example, a submap node located in the center of the static map data) of the static map data. The "grid resolution" indicates the width of a grid. The "grid size" indicates the number of grids in the x direction and the y direction (two dimensions) or the number of grids in the x direction, the y direction, and the z direction (three dimensions). The "value list of grids" indicates values stored in grids. The values stored in the grid indicate, for example, presence probabilities of obstacles.

Subsequently, an example of time-series differential data according to the embodiment is explained with reference to FIG. 20. As illustrated in FIG. 20, the time-series differential data includes "node_id" and "differential sensor data". The "node_id" indicates an ID for identifying a trajectory node. The "differential sensor data" indicates differential data between sensor data and static map data at the time of the trajectory node identified by the node_id. Specifically, the "differential sensor data" is depth information output in the LiDAR point cloud format explained with reference to FIG. 13 or a point cloud format explained with reference to FIG. 14.

Subsequently, an example of the trajectory node data according to the embodiment is explained with reference to FIG. 21. As illustrated in FIG. 21, the trajectory node data includes "time", "node_id", "submap_id", "posture", and "matching data". The "time" indicates time when the trajectory node is generated. The "node_id" indicates an ID for identifying a trajectory node. The "submap_id" indicates an ID of static map data to which the trajectory node belongs. The "posture" indicates a posture (position and orientation) of the trajectory node on a global map. The "matching data" is sensor data used for matching and indicates sensor data at the time of the trajectory node identified by the node_id. Specifically, the "matching data" is depth information output in the LiDAR point cloud format explained with reference to FIG. 13 or the point cloud format explained with reference to FIG. 14.

Subsequently, an example of self-position data in the Local coordinate system according to the embodiment is explained with reference to FIG. 22. Here, a coordinate system of the mobile body 10 is referred to as a Local coordinate system with respect to the Global coordinate system. Based on the input of the input data illustrated in FIG. 17, the generation unit 12 outputs self-position data in the Local coordinate system illustrated in FIG. 22. As illustrated in FIG. 22, the self-position data in the Local coordinate system includes "time" and "posture". The "time" indicates time when the self-position data in the Local coordinate system is output. The "posture" indicates a posture (position and orientation) of the mobile body 10 in the Local coordinate system.

Subsequently, an example of submap-submap constraint conditions according to the embodiment is explained with reference to FIG. 23. As illustrated in FIG. 23, the submap-submap constraint conditions include "time", "matching source submap_id", "matching destination submap_id", and "relative posture". The "time" indicates generation time of the constraint conditions. The "matching source submap_id" indicates submap_id of static map data of a matching source. The "matching destination submap_id" indicates submap_id of static map data of a matching destination. The "relative posture" indicates a relative posture of the static map data of the matching destination with respect to the static map data of the matching source. For example, the "relative posture" indicates a relative posture of a submap node of the static map data of the matching destination with respect to a submap node of the static map data of the matching source.

Subsequently, an example of the submap-trajectory constraint conditions according to the embodiment is explained with reference to FIG. 24. As illustrated in FIG. 24, the submap-trajectory constraint conditions include "time", "matching source submap_id", "matching destination trajectory_id", and "relative posture". The "time" indicates generation time of the constraint conditions. The "matching source submap_id" indicates submap_id of static map data of a matching source. The "matching destination trajectory_id" indicates node_id of a trajectory node of a matching destination. The "relative posture" indicates a relative posture of the trajectory node of the matching source with respect to the static map data of the matching source. For example, the "relative posture" indicates a relative posture of the trajectory node of the matching destination with respect to a submap node of a submap of the static map data of the matching source.

Figure 25:
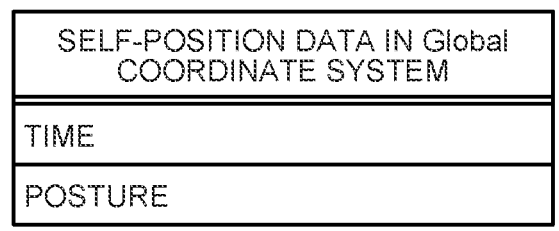
FIG. 25 is a diagram illustrating an example of self-position data in a Global coordinate system according to the embodiment.

Subsequently, an example of self-position data in the global coordinate system according to the embodiment is explained with reference to FIG. 25. The self-position estimation unit 13 outputs self-position data in the global coordinate system illustrated in FIG. 25 based on inputs of the self-position data in the local coordinate system illustrated in FIG. 22 and optimized output data illustrated in FIG. 26 explained below. The self-position estimation unit 13 outputs self-position data in the global coordinate system, which is the latest self-position estimation result of the mobile body 10. As illustrated in FIG. 25, the self-position data in the global coordinate system includes "time" and "posture". The "time" indicates output time of the self-position data in the global coordinate system. The "posture" indicates a posture (position and orientation) of the mobile body 10 in the global coordinate system.

Figure 26:
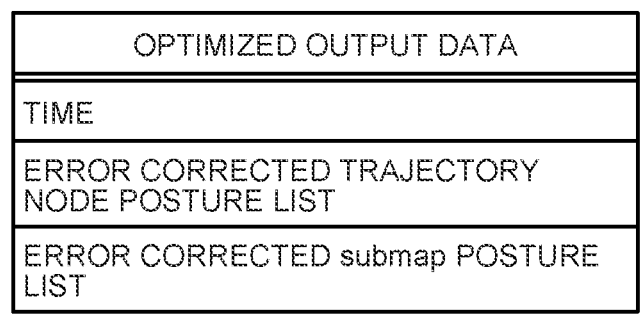
FIG. 26 is a diagram illustrating an example of optimized output data according to the embodiment.

Subsequently, an example of optimized output data according to the embodiment is explained with reference to FIG. 26. The optimization processing unit 120 corrects an error in a posture of a submap or a posture of a trajectory node based on the submap-submap constraint conditions illustrated in FIG. 23 or the submap-trajectory constraint conditions illustrated in FIG. 24. Specifically, the optimization processing unit 120 outputs optimized output data based on the submap-submap constraint conditions or the submap-trajectory constraint conditions and an input of static map data trajectory node data. As illustrated in FIG. 26, the optimized output data includes "time", "error-corrected trajectory node posture list", and "error-corrected submap posture list". The "time" indicates output time of the optimized output data. The "error-corrected trajectory node posture list" indicates a list of postures of trajectory nodes after error correction. The "error-corrected submap posture list" indicates a list of postures of the static map data after the error correction.

2-3. Operation Example of the Information Processing System

Figure 27:
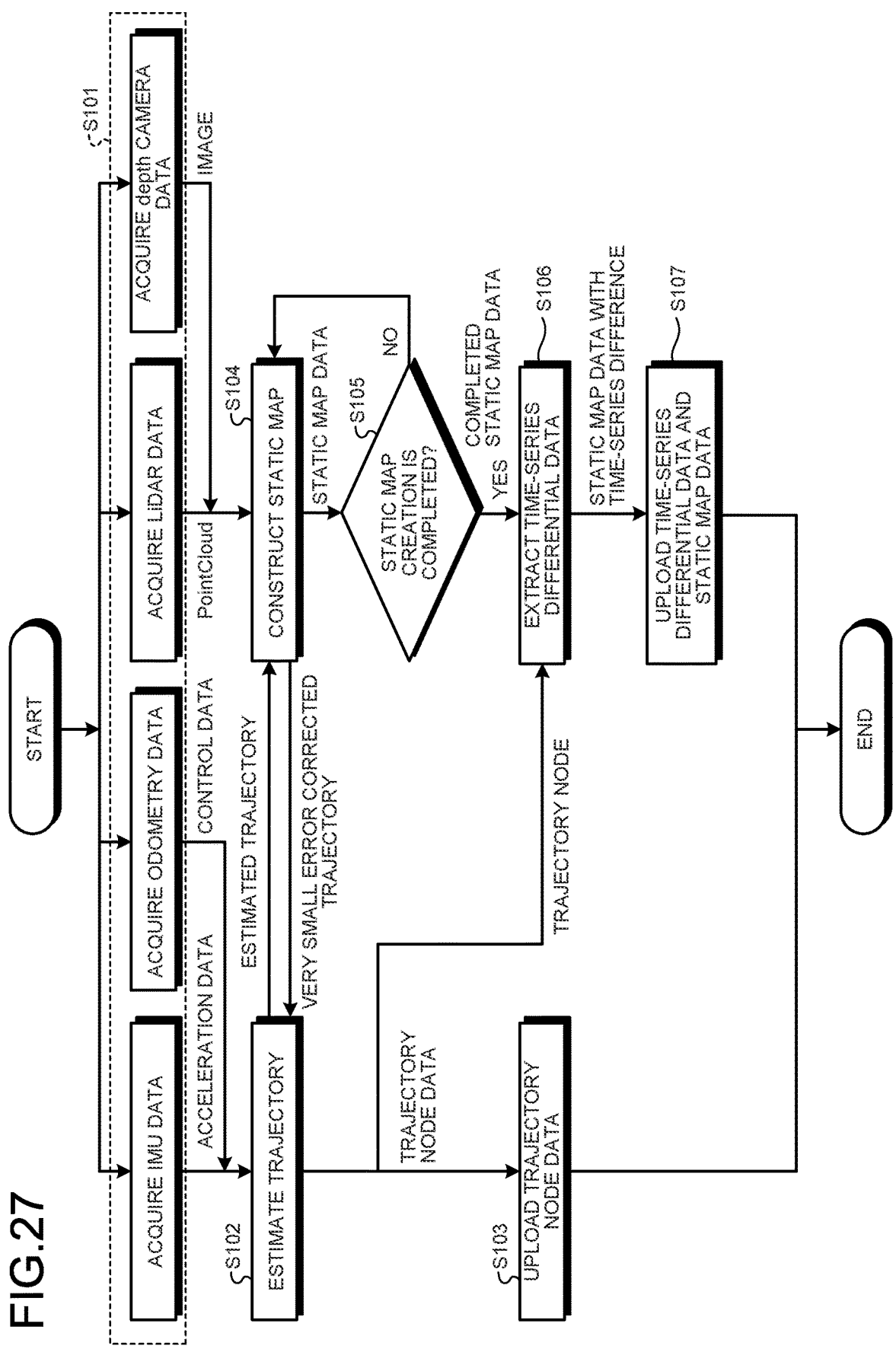
FIG. 27 is a flowchart illustrating an example of submap generation processing in the generation unit 12 according to the embodiment.

Subsequently, a flow of submap generation processing in the generation unit 12 according to the embodiment is explained with reference to FIG. 27. As illustrated in FIG. 27, the generation unit 12 acquires sensor data from the sensor unit 11 (step S101). Specifically, the generation unit 12 acquires output data of the IMU from the IMU. For example, the generation unit 12 acquires acceleration data from the IMU. The generation unit 12 acquires output data of the odometry from the odometry. For example, the generation unit 12 acquires control data from the odometry. The generation unit 12 acquires output data of the LiDAR from LiDAR. For example, the generation unit 12 acquires a point cloud from the LiDAR. The generation unit 12 acquires output data of the depth camera from the depth camera. For example, the generation unit 12 acquires an image from the depth camera.

After acquiring the output data of the IMU and the output data of the odometry, the generation unit 12 estimates a trajectory of the mobile body 10 based on the output data of the IMU and the output data of the odometry (step S102). Specifically, the generation unit 12 generates the trajectory node data based on the output data of the IMU and the output data of the odometry.

When acquiring the output data of the LiDAR and the output data of the depth camera, the generation unit 12 constructs static map data based on the output data of the LiDAR and the output data of the depth camera (step S104). After generating the static map data, the generation unit 12 corrects a very small error of the estimated trajectory based on the generated static map data.

The generation unit 12 uploads the trajectory node data after the correction of the very small error to the information processing apparatus 100 (step S103).

After constructing the static map data, the generation unit 12 determines whether the creation of the static map data is completed (step S105). When the generation unit 12 determines that the creation of the static map data is not completed (step S105; No), the processing returns to step S104.

On the other hand, when determining that the creation of the static map data is completed (step S105; Yes), the generation unit 12 extracts time-series differential data in trajectory nodes included in the static map data based on sensor data such as the created static map data, the trajectory node data after the correction of the very small error, and output data of the LiDAR (step S106).

After extracting the time-series differential data in the trajectory nodes, the generation unit 12 uploads the time-series differential data and the static map data to the information processing apparatus 100 (step S107).

Figure 28:
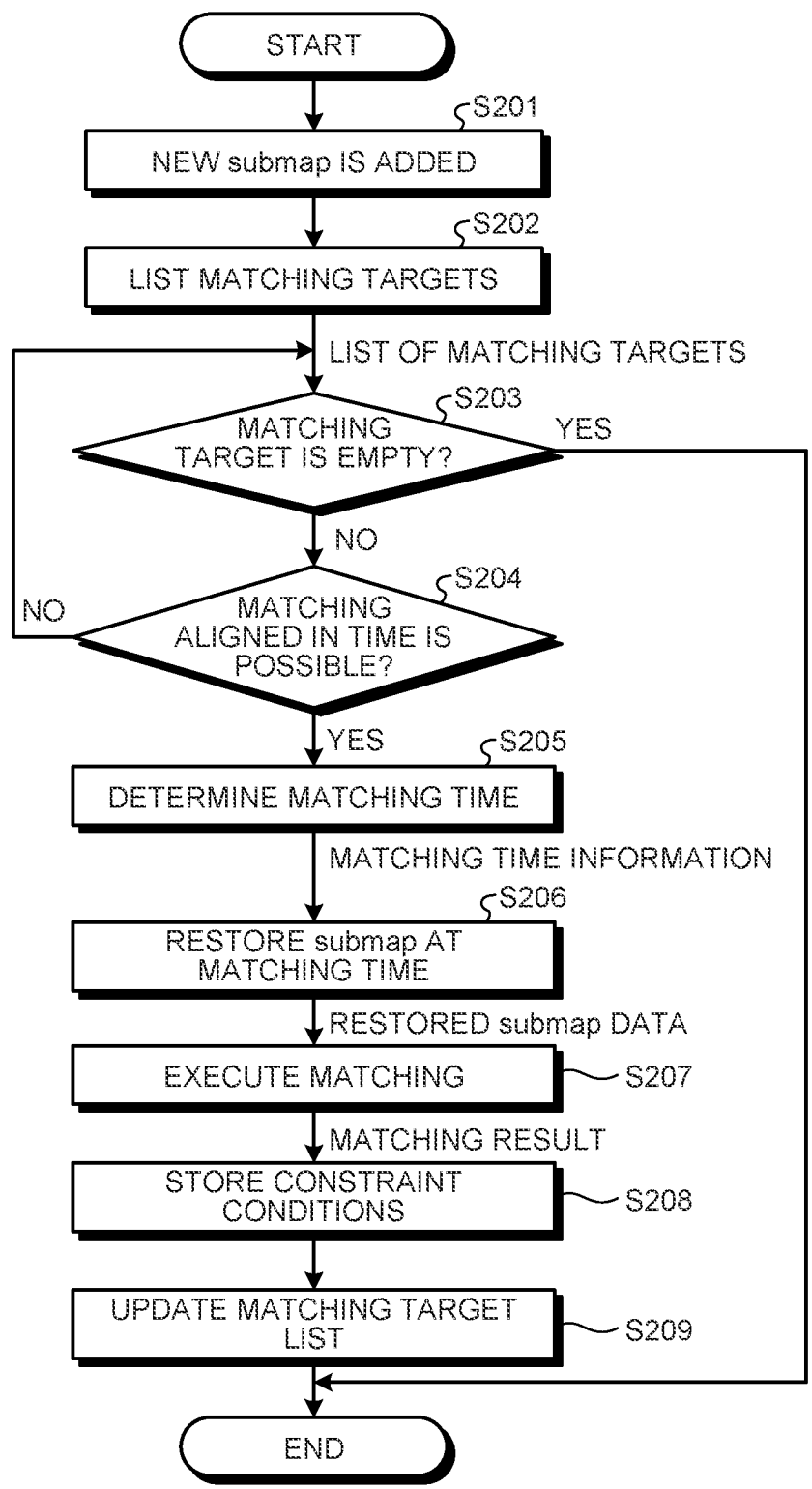
FIG. 28 is a flowchart illustrating an example of submap-submap matching processing according to the embodiment.

Subsequently, a flow of submap-submap matching processing according to the embodiment is explained with reference to FIG. 28. As illustrated in FIG. 28, a new submap is added from the mobile body 10 to the storage unit of the information processing apparatus 100 (step S201).

When the new submap is added, the matching unit 110 lists combinations of submaps to be matched (step S202).

Subsequently, after listing the combinations of the submaps, the matching unit 110 determines whether a matching target is empty (step S203). When the matching unit 110 determines that the matching target is empty (step S203; Yes), the processing ends.

On the other hand, when determining that the matching target is not empty (step S203; No), the matching unit 110 determines whether matching aligned in time is possible (step S204). When the matching unit 110 determines that the matching aligned in time is impossible (step S204; No), the processing returns to step S203.

On the other hand, when determining that the matching aligned in time is possible (step S204; Yes), the matching unit 110 determines matching time (step S205). Subsequently, after determining the matching time, the matching unit 110 restores a submap at the matching time based on time-series differential data at the matching time (step S206).

Subsequently, after restoring the submap at the matching time, the matching unit 110 performs matching based on the restored submap data (step S207).

Subsequently, after executing the matching, the matching unit 110 generates submap-submap constraint conditions based on a matching result. After generating the submap-submap constraint conditions, the matching unit 110 stores the generated submap-submap constraint conditions (step S208). Subsequently, after storing the submap-submap constraint conditions, the matching unit 110 updates the matching target list (step S209).

Subsequently, an example of matching target data of matching between a submap and a submap according to the embodiment is explained with reference to FIG. 29. As illustrated in FIG. 29, the matching target data of the matching between a submap and a submap includes "matching source submap_id", "matching destination submap_id", and "initial relative posture". The "matching source submap_id" indicates submap_id of static map data of a matching source. The "matching destination submap_id" indicates submap_id of static map data of a matching destination. The "initial relative posture" indicates an initial position of a relative posture of the static map data of the matching destination with respect to the static map data of the matching source.

Subsequently, an example of submap restoration time data according to the embodiment is explained with reference to FIG. 30. As illustrated in FIG. 30, the submap restoration time data includes "submap_id", "restoration time", and "restoration node_id". The "submap_id" indicates submap_id of static map data of a submap to be restored. The "restoration time" indicates a time target to be restored. The "restoration node_id" indicates node_id of the time target to be restored. Note that one of the "restoration time" and the "restoration node_id" only has to be stored as the submap restoration time data.

Figure 31:
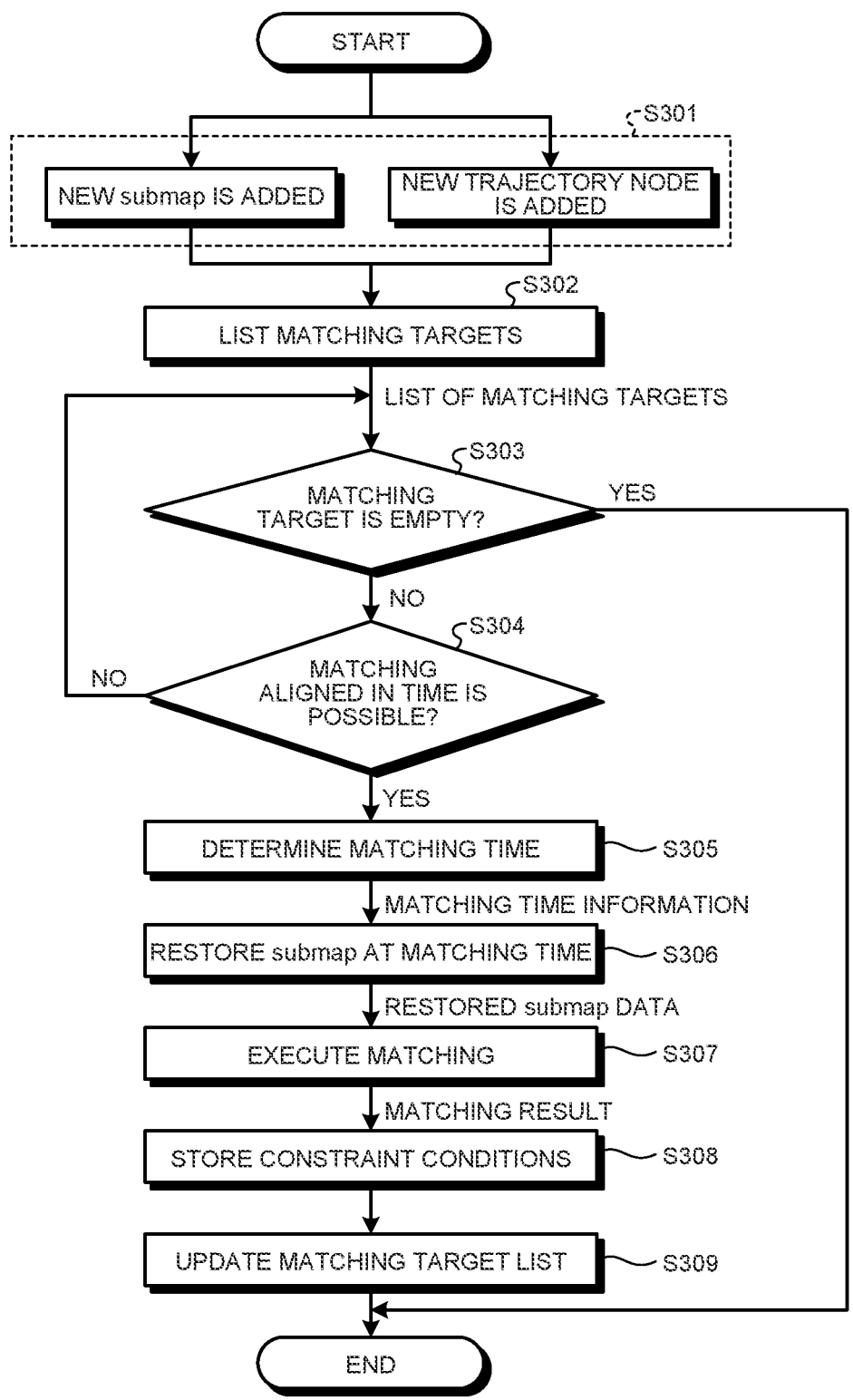
FIG. 31 is a flowchart illustrating an example of submap-trajectory matching processing according to the embodiment.

Subsequently, a flow of submap-trajectory matching processing according to the embodiment is explained with reference to FIG. 31. As illustrated in FIG. 31, a new submap and a new trajectory node are added from the mobile body 10 to the storage unit of the information processing apparatus 100 (step S301).

When the new submap and the new trajectory node are added, the matching unit 110 lists combinations of submaps and trajectory nodes to be matched (step S302).

Subsequently, after listing the combinations of the submaps and the trajectory nodes, the matching unit 110 determines whether the matching target is empty (step S303). When determining that the matching target is empty (step S303; Yes), the matching unit 110 ends the processing.

On the other hand, when determining that the matching target is not empty (step S303; No), the matching unit 110 determines whether matching aligned in time is possible (step S304). When determining that the matching aligned in time is impossible (step S304; No), the matching unit 110 returns to step S303.

On the other hand, when determining that matching aligned in time is possible (step S304; Yes), the matching unit 110 determines matching time (step S305). Subsequently, after determining the matching time, the matching unit 110 restores a submap at the matching time based on time-series differential data at the matching time (step S306).

Subsequently, after restoring the submap at the matching time, the matching unit 110 executes matching based on the restored submap data and sensor data in a trajectory node (step S307). Subsequently, after executing the matching, the matching unit 110 generates submap-trajectory constraint conditions based on a matching result. After generating the submap-trajectory constraint conditions, the matching unit 110 stores the generated submap-trajectory constraint conditions (step S308). Subsequently, after storing the submap-trajectory constraint conditions, the matching unit 110 updates the matching target list (step S309).

Figure 32:
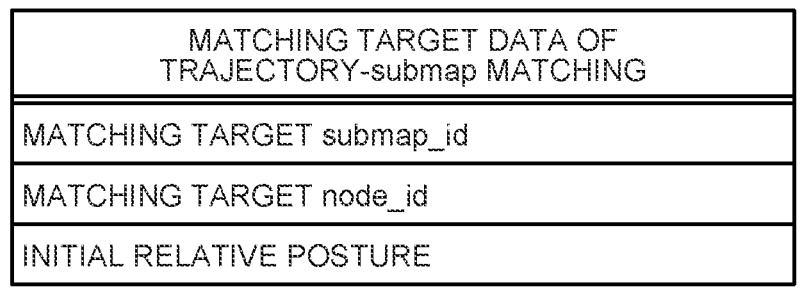
FIG. 32 is a diagram illustrating an example of matching target data of matching between a submap and a trajectory according to the embodiment.

Next, an example of matching target data of matching between a submap and a trajectory according to the embodiment is explained with reference to FIG. 32. As illustrated in FIG. 32, the matching target data of the matching between a submap and a trajectory includes "matching target submap_id", "matching target node_id", and "initial relative posture". The "matching target submap_id" indicates submap_id of static map data of a submap to be matched. The "matching target node_id" indicates node_id of a trajectory node to be matched. The "initial relative posture" indicates an initial position of a relative posture of the matching target trajectory node with respect to the matching target static map data.

3. Second Embodiment

Figure 33:
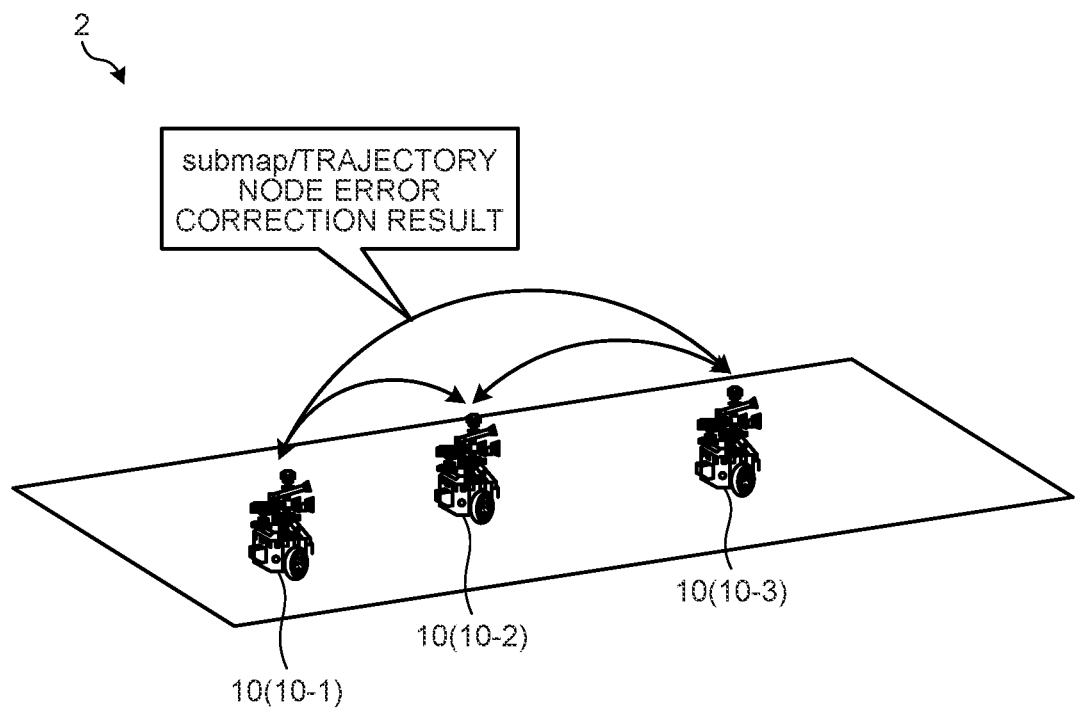
FIG. 33 is a diagram illustrating a schematic configuration example of an information processing system according to a second embodiment of the present disclosure.

Next, a schematic configuration example of an information processing system according to a second embodiment of the present disclosure is explained with reference to FIG. 33. As illustrated in FIG. 33, an information processing system 2 according to the embodiment has a P2P configuration. As illustrated in FIG. 33, the information processing system 2 includes a plurality of mobile bodies 10.

Specifically, each of the plurality of mobile bodies 10 observes sensor data with various sensors mounted on the mobile body 10 while moving. Each of the plurality of mobile bodies 10 generates a submap and a trajectory node based on the sensor data. Each of the plurality of mobile bodies 10 synchronizes data of the generated submap and the generated trajectory node with each other through P2P (Peer-to-Peer) communication or the like. Subsequently, each of the plurality of mobile bodies 10 separately performs submap-trajectory matching processing or submap-submap matching processing and error correction of a map. Subsequently, each of the plurality of mobile bodies 10 communicates and synchronizes results of the error correction with one another. Each of the plurality of mobile bodies 10 estimates a self-position based on a result of synchronizing the results of the error correction with one another.

4. Summary

As explained above, according to the embodiments of the present disclosure, when matching sensor data among a plurality of mobile bodies, the information processing apparatus performs matching while aligning times of the sensor data. Consequently, even when a dynamic obstacle is included in an environment, the information processing apparatus can utilize the dynamic obstacle as a landmark common to a plurality of mobile bodies. Therefore, the information processing apparatus can improve estimation accuracy of a self-position.

Specifically, the information processing apparatus can generate a more accurate map. For example, when SLAM is performed by a plurality of mobile bodies, the plurality of mobile bodies can be present at the same time in near spaces. However, when an initial position of matching is known, accuracy of a map can be further improved by matching sensor data of spatially close mobile bodies. By matching sensor data temporally close to each other (referred to as time constraint as well) in addition to the space constraint, the accuracy of the map can be further improved. Therefore, the information processing apparatus can generate a more accurate map even when a dynamic obstacle is included in an environment. Since the information processing apparatus can estimate a self-position based on the more accurate map, the estimation accuracy of the self-position can be improved.

5. Hardware Configuration

Figure 34:
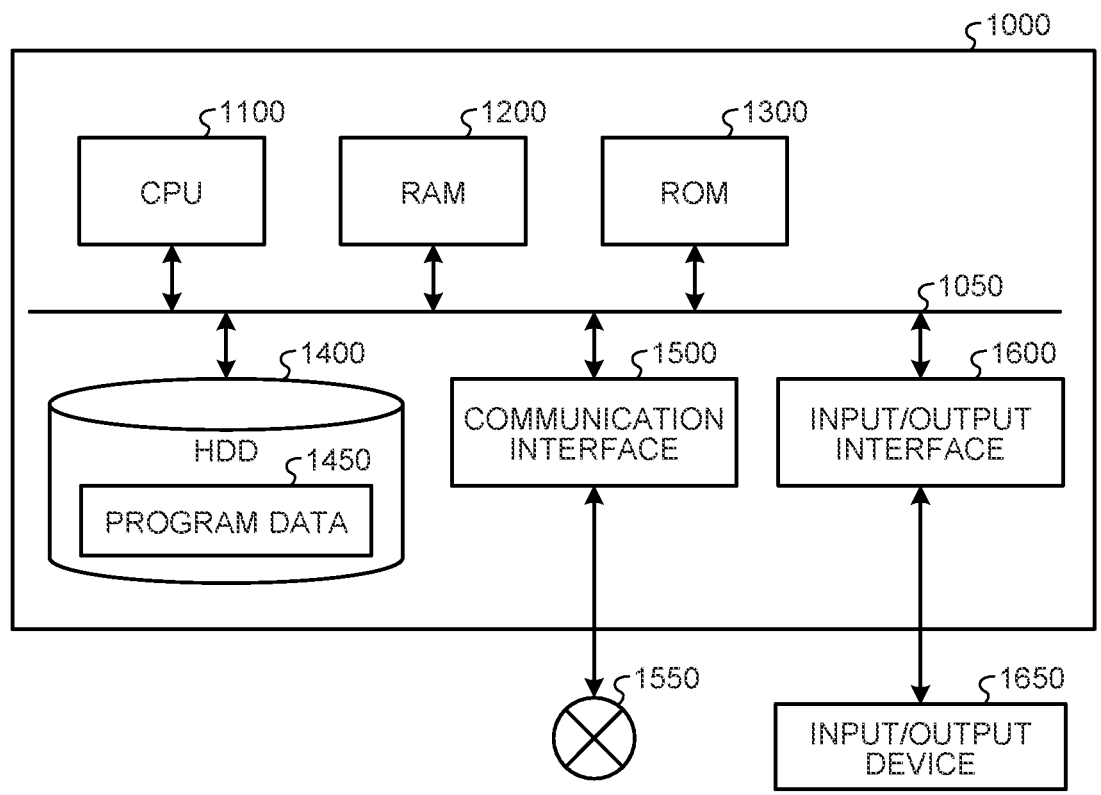
FIG. 34 is a hardware configuration diagram illustrating an example of a computer that realizes functions of an information processing apparatus.

The information equipment such as the information processing apparatus 100 according to the embodiments explained above is realized by, for example, a computer 1000 having a configuration illustrated in FIG. 34. FIG. 34 is a hardware configuration diagram illustrating an example of the computer 1000 that reproduces functions of an information processing apparatus such as the information processing apparatus 100. In the following explanation, the information processing apparatus 100 according to the embodiment is explained as an example. The computer 1000 includes a CPU 1100, a RAM 1200, a ROM (Read Only Memory) 1300, a HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a Basic Input Output System (BIOS) executed by the CPU 1100 at a start time of the computer 1000, a program depending on hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical Disk), a tape medium, a magnetic recording medium, or a semiconductor memory.

For example, when the computer 1000 functions as the information processing apparatus 100 according to the embodiment, the CPU 1100 of the computer 1000 reproduces the functions of the control unit 110 and the like by executing the information processing program loaded on the RAM 1200. The HDD 1400 stores an information processing program according to the present disclosure and data in a storage unit. Note that the CPU 1100 reads the program data 1450 from the HDD 1400 and executes the program data. However, as another example, the CPU 1100 may acquire these programs from another device via the external network 1550.

Note that the present technique can also take the following configurations.

(1)

An information processing apparatus comprising:
a self-position estimation unit that estimates a self-position of a mobile body based on information concerning a position of a moving object at predetermined time retained by the mobile body and information concerning a position of the moving object at the predetermined time retained by another mobile body.

(2)

The information processing apparatus according to (1), wherein
the self-position estimation unit
estimates the self-position of the mobile body based on partial map information including position information of the moving object at the predetermined time retained by the mobile body and other partial map information including position information of the moving object at the predetermined time retained by the another mobile body.

(3)

The information processing apparatus according to (2), further comprising
a matching unit that matches a relative positional relation between the partial map information and the other partial map information based on the partial map information and the other partial map information, wherein
the self-position estimation unit
estimates the self-position of the mobile body based on a matching result by the matching unit.

(4)

The information processing apparatus according to (3), further comprising
an optimization processing unit that corrects, based on the matching result by the matching unit, an error of entire map information constructed by combining a plurality of kinds of partial map information, wherein
the matching unit
generates first constraint condition information indicating a relative positional relation between the partial map information and the other partial map information by matching the relative positional relation between the partial map information and the other partial map information,
the optimization processing unit
corrects an error of the entire map information based on the first constraint condition information generated by the matching unit, and
the self-position estimation unit
estimates the self-position of the mobile body based on the entire map information, the error of which is corrected by the optimization processing unit.

(5)

The information processing apparatus according to (3) or (4), further comprising
a generation unit that extracts point group information indicating a position of the moving object at the predetermined time retained by the mobile body by superimposing point group information indicating a position of an object at the predetermined time retained by the mobile body in static partial map information including position information of a static object and removing point group information superimposed on a position of the static object included in the static partial map information out of the superimposed point group information, wherein
the matching unit
restores the partial map information including the position of the moving object at the predetermined time retained by the mobile body by superimposing the point group information extracted by the generation unit on the static partial map information,
the generation unit
extracts point group information indicating a position of the moving object at the predetermined time retained by the another mobile body by superimposing point group information indicating a position of an object at the predetermined time retained by the another mobile body on static partial map information including position information of a static object and removing point group information superimposed on a position of the static object included in the static partial map information out of the superimposed point group information, and
the matching unit
restores the other partial map information including the position of the moving object at the predetermined time retained by the another mobile body by superimposing the point group information extracted by the generation unit on the static partial map information.

(6)
The information processing apparatus according to (1), wherein
the self-position estimation unit
estimates a self-position of the mobile body based on partial map information including position information of the moving object at the predetermined time retained by the mobile body, point group information indicating a position of the moving object at the predetermined time retained by the another mobile body, and trajectory position information indicating a position of the another mobile body on a trajectory.

(7)
The information processing apparatus according to (6), further comprising
a matching unit that matches a relative positional relation between the partial map information and the trajectory position information based on the partial map information, the point group information, and the trajectory position information, wherein
the self-position estimation unit
estimates a self-position of the mobile body based on a matching result by the matching unit.

(8)
The information processing apparatus according to (7), further comprising
an optimization processing unit that corrects, based on a matching result by the matching unit, an error of entire trajectory position information of a predetermined mobile body constructed by combining trajectory position information indicating a position on a trajectory of the predetermined mobile body, wherein
the matching unit
generates a second constraint condition indicating a relative positional relation between the trajectory position information and the partial map information by matching the relative positional relation between the trajectory position information and the partial map information,
the optimization processing unit
corrects an error of the entire trajectory position information based on a second constraint condition generated by the matching unit, and
the self-position estimation unit
estimates a self-position of the mobile body based on the entire trajectory position information, the error of which is corrected by the optimization processing unit.

(9)
The information processing apparatus according to (7) or (8), further comprising
a generation unit that extracts point group information indicating a position of the moving object at the predetermined time retained by the mobile body by superimposing point group information indicating a position of an object at the predetermined time retained by the mobile body on static partial map information including position information of the static object and removing the point group information superimposed on the position of the static object included in the static partial map information out of the superimposed point group information, wherein
the matching unit
restores partial map information including a position of the moving object at the predetermined time retained by the mobile body by superimposing the point group information extracted by the generation unit on the static partial map information.

(10)
An information processing method, by a computer, comprising:
estimating a self-position of a mobile body based on information concerning a position of a moving object at a predetermined time retained by the mobile body and information concerning a position of the moving object at the predetermined time retained by another mobile body.

(11)
An information processing program for causing a computer to execute:
self-position estimation processing of estimating a self-position of a mobile body based on information concerning a position of a moving object at a predetermined time retained by the mobile body and information concerning a position of the moving object at the predetermined time retained by another mobile body.

REFERENCE SIGNS LIST

1 INFORMATION PROCESSING SYSTEM
10 MOBILE BODY
11 SENSOR UNIT
12 GENERATION UNIT
13 SELF-POSITION ESTIMATION UNIT
100 INFORMATION PROCESSING APPARATUS
110 MATCHING UNIT
120 OPTIMIZATION PROCESSING UNIT

The invention claimed is:
1. An information processing apparatus comprising:
circuitry configured to estimate a self-position of a first mobile body based on
information concerning a position of a moving object at a predetermined time retained by the first mobile body, information concerning a position of the moving object at the predetermined time retained by a second mobile body, and information concerning a position of the second mobile body at the predetermined time, wherein the circuitry is further configured to control autonomous movement of the first mobile body based on the estimated self-position, and wherein the circuitry estimates the self-position of the first mobile body further based on partial map information including position information of the moving object at the predetermined time retained by the first mobile body, point group information indicating a position of the moving object at the predetermined time retained by the second mobile body, and trajectory position information indicating the position of the second mobile body on a trajectory.

2. The information processing apparatus according to claim 1, wherein the circuitry is further configured to estimate the self-position of the first mobile body based on first partial map information including position information of the moving object at the predetermined time retained by the first mobile body, and second partial map information including position information of the moving object at the predetermined time retained by the second mobile body.

3. The information processing apparatus according to claim 2, wherein the circuitry is further configured to:

match a relative positional relation between the first partial map information and the second partial map information; and estimate the self-position of the first mobile body based on a matching result.

4. The information processing apparatus according to claim 3, wherein the circuitry is further configured to:

generate first constraint condition information indicating the relative positional relation between the first partial map information and the second partial map information by matching the relative positional relation between the first partial map information and the second partial map information;

correct an error of map information based on the first constraint condition information; and estimate the self-position of the first mobile body based on the corrected map information.

5. The information processing apparatus according to claim 4, wherein the circuitry is further configured to distribute the corrected map information to the first mobile body.

6. The information processing apparatus according to claim 3, wherein the circuitry is further configured to:

extract point group information indicating a position of the moving object at the predetermined time retained by the first mobile body by superimposing point group information indicating a position of an object at the predetermined time retained by the first mobile body in static partial map information including position information of a static object and removing point group information superimposed on a position of the static object included in the static partial map information out of the superimposed point group information;

restore the partial map information including the position of the moving object at the predetermined time retained by the first mobile body by superimposing the extracted point group information on the static partial map information;

extract point group information indicating the position of the moving object at the predetermined time retained by the second mobile body by superimposing point group information indicating a position of an object at the predetermined time retained by the second mobile body on static partial map information including position information of a static object and removing point group information superimposed on a position of the static object included in the static partial map information out of the superimposed point group information; and restore the second partial map information including the position of the moving object at the predetermined time retained by the second mobile body by superimposing the extracted point group information on the static partial map information.

7. The information processing apparatus according to claim 3, wherein the circuitry is further configured to match the relative positional relation between the first partial map information and the second partial map information when the first mobile body and the second mobile body come closest to each other.

8. The information processing apparatus according to claim 1, wherein the circuitry is further configured to:

match a relative positional relation between the partial map information and the trajectory position information based on the partial map information, the point group information, and the trajectory position information; and estimate the self-position of the first mobile body based on a matching result.

9. The information processing apparatus according to claim 8, wherein the circuitry is further configured to:

correct, based on the matching result, an error of trajectory position information of a predetermined mobile body constructed by combining trajectory position information indicating a position on a trajectory of the predetermined mobile body;

generate a second constraint condition indicating a relative positional relation between the trajectory position information and the partial map information by matching the relative positional relation between the trajectory position information and the partial map information;

correct an error of the trajectory position information based on the second constraint condition; and estimate the self-position of the first mobile body based on the corrected trajectory position information.

10. The information processing apparatus according to claim 7, wherein the circuitry is further configured to:

extract point group information indicating a position of the moving object at the predetermined time retained by the first mobile body by superimposing point group information indicating a position of an object at the predetermined time retained by the first mobile body on static partial map information including position information of the static object and removing the point group information superimposed on the position of the static object included in the static partial map information out of the superimposed point group information; and restore partial map information including a position of the moving object at the predetermined time retained by the first mobile body by superimposing the extracted point group information on the static partial map information.

11. An information processing method, executed by a computer, the method comprising:

estimating a self-position of a first mobile body based on
information concerning a position of a moving object at a predetermined time retained by the first mobile body,
information concerning a position of the moving object at the predetermined time retained by a second mobile body, and
information concerning a position of the second mobile body at the predetermined time; and controlling autonomous movement of the first mobile body based on the estimated self-position, wherein the self-position of the first mobile body is estimated further based on
partial map information including position information of the moving object at the predetermined time retained by the first mobile body,
point group information indicating a position of the moving object at the predetermined time retained by the second mobile body, and
trajectory position information indicating the position of the second mobile body on a trajectory.

12. A non-transitory computer-readable storage medium having embodied thereon an information processing program, which when executed by a computer causes the computer to execute a method, the method comprising:

estimating a self-position of a first mobile body based on
information concerning a position of a moving object at a predetermined time retained by the first mobile body,
information concerning a position of the moving object at the predetermined time retained by another a second mobile body, and
information concerning a position of the second mobile body; and controlling autonomous movement of the first mobile body based on the estimated self-position, wherein the self-position of the first mobile body is estimated further based on
partial map information including position information of the moving object at the predetermined time retained by the first mobile body,
point group information indicating a position of the moving object at the predetermined time retained by the second mobile body, and
trajectory position information indicating the position of the second mobile body on a trajectory.

* * * * *